(12) United States Patent
Ohwa

(10) Patent No.: US 11,394,856 B2
(45) Date of Patent: Jul. 19, 2022

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Yasushi Ohwa, Toyko (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 17/033,056

(22) Filed: Sep. 25, 2020

(65) Prior Publication Data
US 2021/0099617 A1 Apr. 1, 2021

(30) Foreign Application Priority Data

Sep. 30, 2019 (JP) .............................. JP2019-180713

(51) Int. Cl.
*H04N 5/217* (2011.01)
*G06T 5/00* (2006.01)
*G06T 5/50* (2006.01)

(52) U.S. Cl.
CPC .............. *H04N 5/217* (2013.01); *G06T 5/001* (2013.01); *G06T 5/50* (2013.01); *G06T 2207/20081* (2013.01)

(58) Field of Classification Search
CPC .............. H04N 5/217; H04N 5/23245; H04N 5/23267; H04N 5/232935; H04N 5/23293; H04N 5/2253; H04N 5/2251; H04N 5/23229; G06T 5/001; G06T 5/50; G06T 2207/20081; G06T 2207/20201; G06T 5/003; G06N 3/08

USPC ......................................................... 348/241
See application file for complete search history.

(56) References Cited

U.S. PATENT DOCUMENTS

2018/0137389 A1 5/2018 Mathieu
2020/0349680 A1 11/2020 Tao

FOREIGN PATENT DOCUMENTS

| CN | 108629743 A | 10/2018 |
| EP | 1830563 A1 | 9/2007 |
| EP | 3557860 A1 | 10/2019 |
| GN | 109522828 A | 3/2019 |
| JP | 2012-212322 A | 11/2012 |
| JP | 2018-207416 A | 12/2018 |
| WO | 2018/116824 A1 | 6/2018 |

OTHER PUBLICATIONS

European Search Report dated Jan. 22, 2021, that issued in the corresponding European Patent Application No. 20196371.7.

(Continued)

*Primary Examiner* — Stephen P Coleman
(74) *Attorney, Agent, or Firm* — Cowan, Liebowitz & Latman, P.C.

(57) ABSTRACT

An image processing apparatus comprises reduction unit configured to reduce predetermined disturbance in a frame image shot by an image sensor; estimation unit configured to estimate from at least one first frame image from which the disturbance is reduced, a second frame image of a point of time after the first frame image using a learning model; and addition unit configured to add the disturbance to the second frame image.

16 Claims, 14 Drawing Sheets

(56) References Cited

OTHER PUBLICATIONS

Vedran Vukotic, et al., "One-Step Time-Dependent Future Video Frame Prediction with a Convolutional Encoder-Decoder Neural Network", Oct. 13, 2017 (Oct. 13, 2017), Big Data Analytics in the Social and Ubiquitous Context: 5th International Workshop on Modeling Social Media, MSM 2014, 5th International Workshop on Mining Ubiquitous and Social Envionments, Muse 2014 Adfirst International Workshop on Machine Le, XP047450832, ISBN: 978-3-642-17318-9 [retrieved on Oct. 13, 2017].

| OPERATION MODE | DISPLAY FRAME RATE | LEARNING MODEL |
|---|---|---|
| LOW-SPEED CONTINUOUS SHOOTING (NORMAL) | 60fps | LEARNING MODEL OF 60fps |
| LOW-SPEED CONTINUOUS SHOOTING (POWER SAVING) | 30fps | LEARNING MODEL OF 30fps |
| HIGH-SPEED CONTINUOUS SHOOTING (NORMAL) | 120fps | LEARNING MODEL OF 120fps |
| HIGH-SPEED CONTINUOUS SHOOTING (POWER SAVING) | 60fps | LEARNING MODEL OF 60fps |

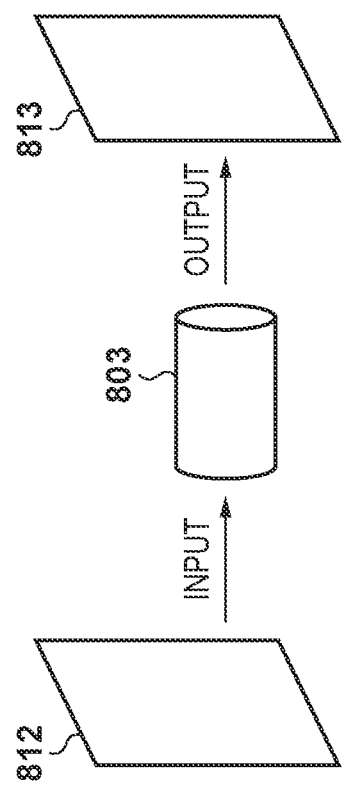
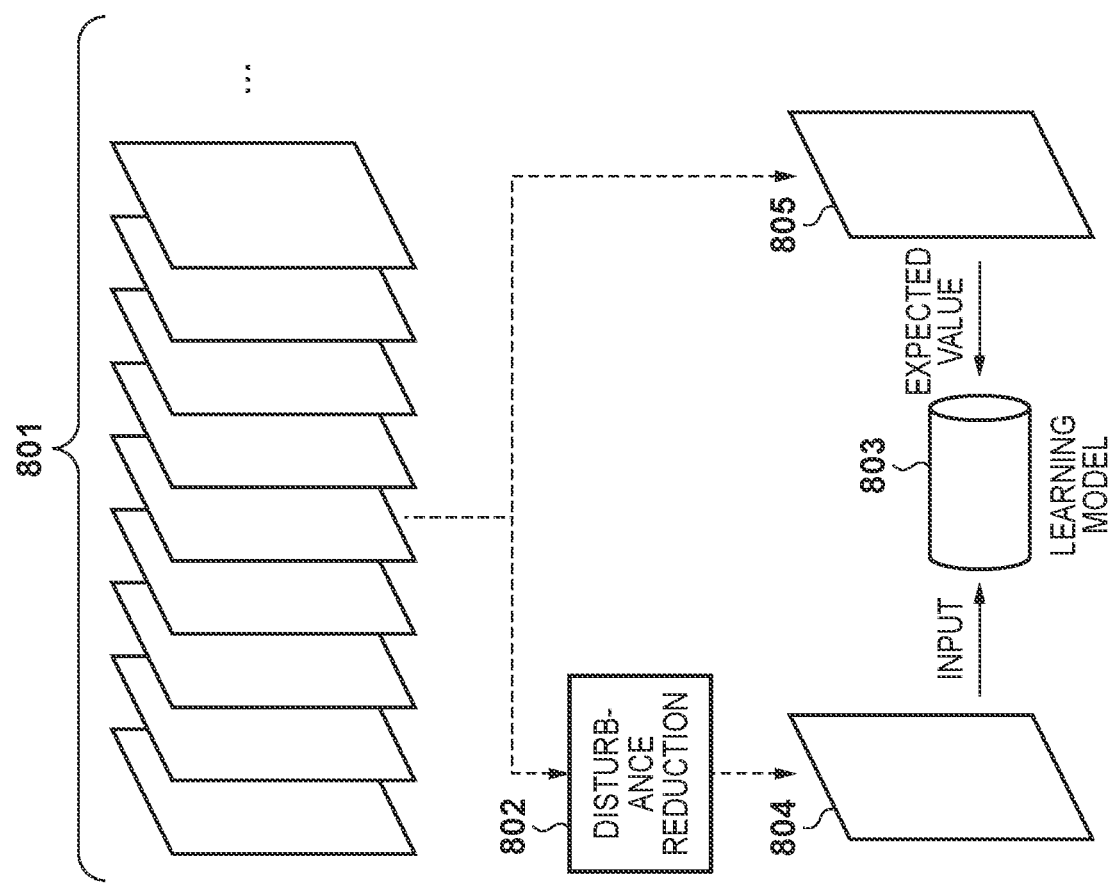

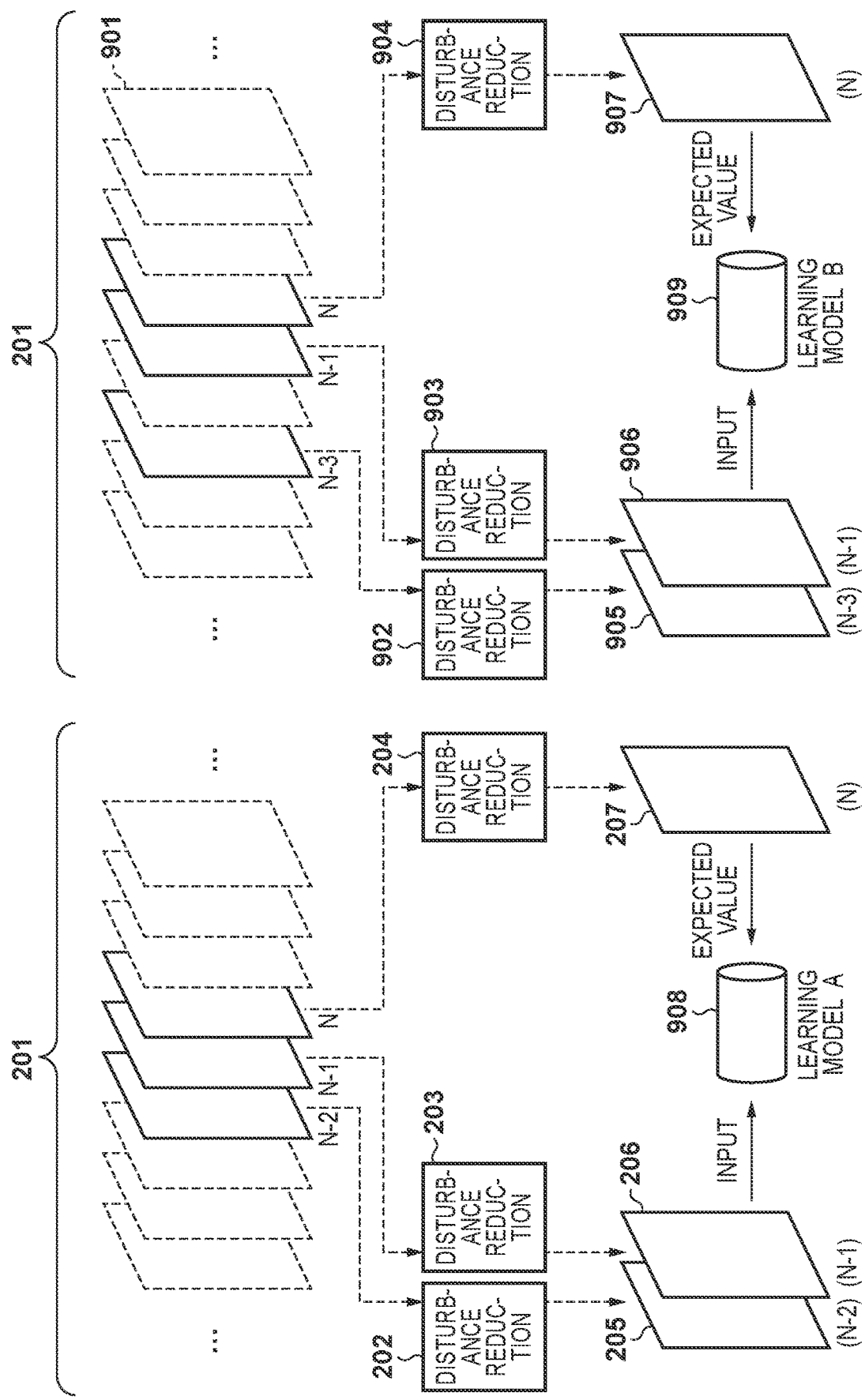

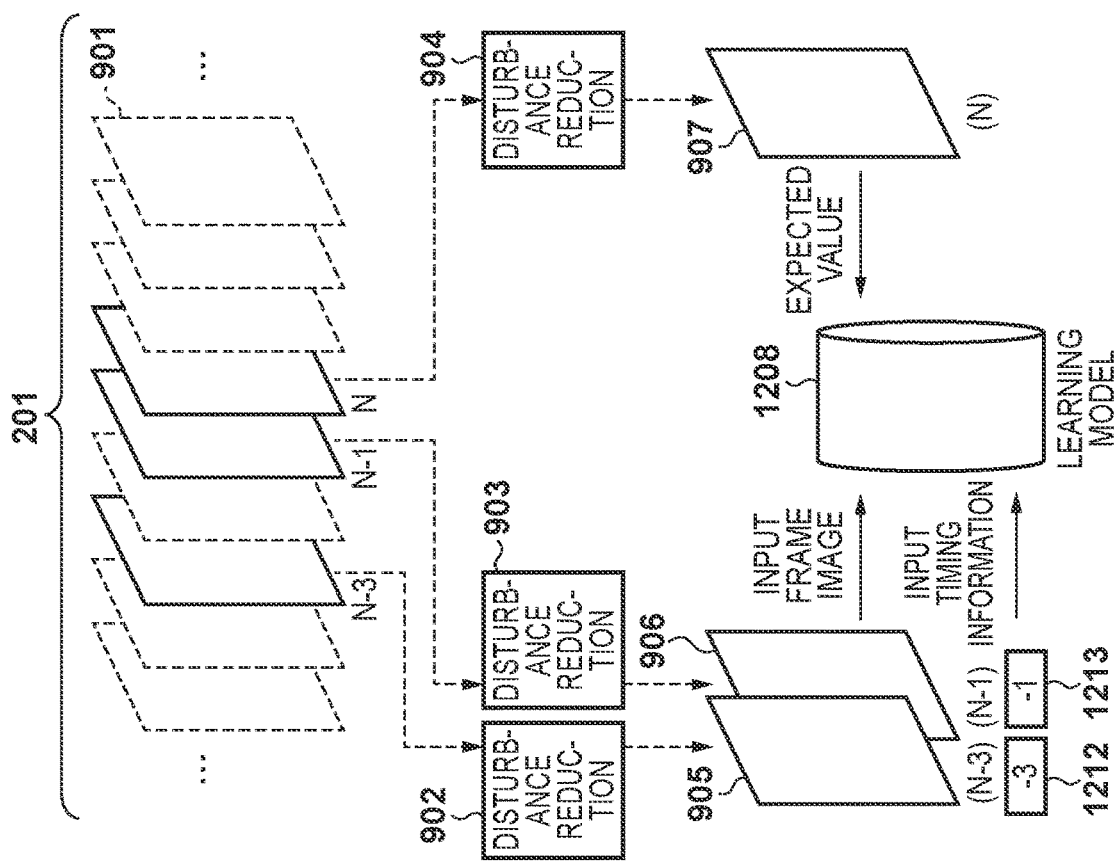
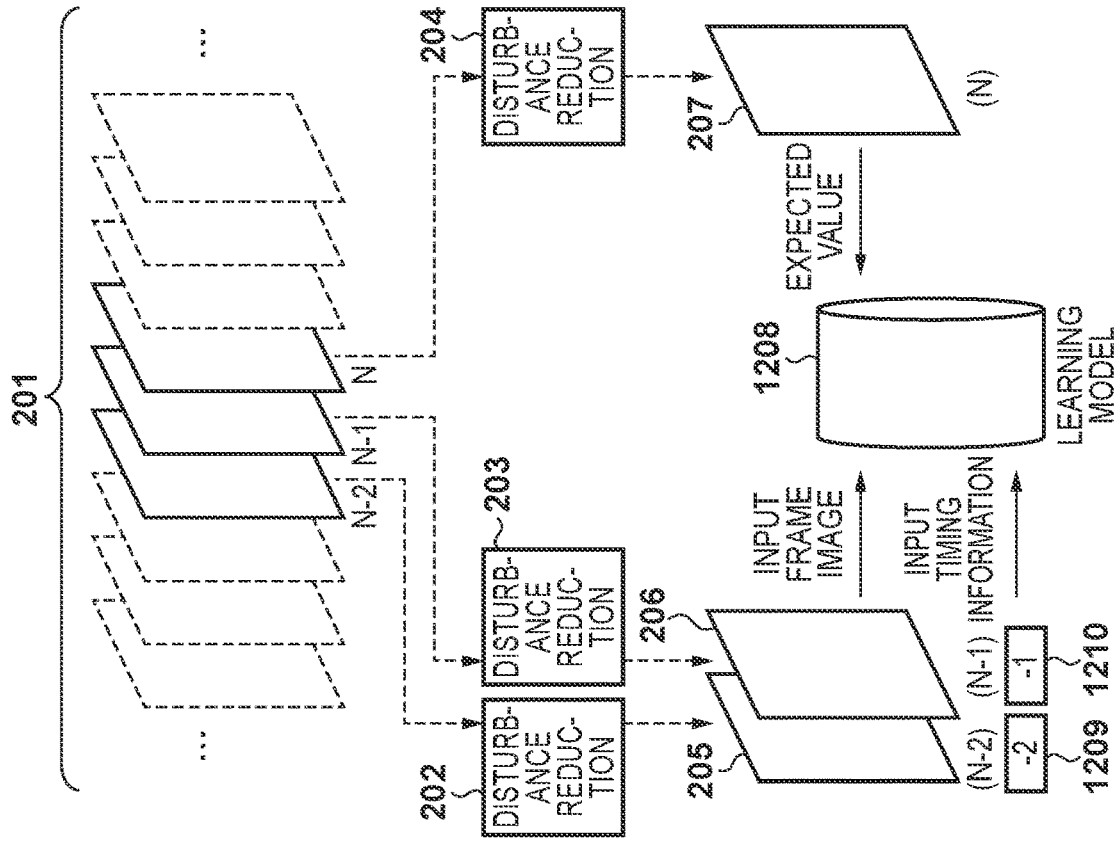

IMAGE PROCESSING APPARATUS AND METHOD, AND IMAGE CAPTURING APPARATUS

BACKGROUND OF THE INVENTION

Field of the Invention

The present invention relates to an image processing apparatus and method, and an image capturing apparatus, and more particularly to a technique for displaying a captured image on a display.

Description of the Related Art

Some image capturing apparatuses have a live view (LV) function of continuously shooting images and sequentially displaying the obtained images on a display. In general, images for LV (hereinafter, referred to as "LV images") are captured at a predetermined intervals and are sequentially displayed. Therefore, the user can shoot and record an image of a subject while confirming the subject in the LV display.

When the image capturing apparatus has only one image sensor, the image sensor needs to output both the image data of the still image and the image data of the LV images. Therefore, while the image sensor is driven to capture a still image, the image sensor cannot be driven to capture LV images. In particular, when performing continuous shooting of still images during LV display, the shooting timing of a still image and the shooting timing of an LV image may overlap depending on the shooting start timing and the interval between the continuous shooting. In that case, since the LV image cannot be obtained, the LV display may freeze as the LV image of the previous frame is displayed a plurality of times, or a so-called blackout in which a fixed color is displayed on the entire display screen may occur.

In a case where the LV image of a certain frame cannot be obtained as described above, it is conceivable to generate a substitute LV image of the frame that was not obtained by synthesizing the LV images of the frames before and after the lost frame, and display the substitute LV image.

In that case, as described in Japanese Patent Laid-Open No. 2012-212322, it is considered that a foreground image and a background image are generated by image processing using a view model and displayed as a substitute frame image of a non-updated frame. In this technique, the view model is learned by comparing an image feature amount of an image at times and a synthesis view obtained by performing geometric transformation view models that use the image feature amounts of a foreground image and a background image of the image at time s as parameters, respectively, and synthesizing the transformed view models.

However, in the image synthesis using the anterior and posterior frames and the conventional technique disclosed in Japanese Patent Laid-Open No. 2012-212322, the accuracy of the generated image is low and the generated image is much different from the real image, and thus the visibility is not greatly improved.

Further, if the exposure period of the still image is long, the blackout period or the non-update period of the LV image also becomes long, the generation accuracy of the substitute frame image of the non-update frame will be further deteriorated, and the visibility will be further deteriorated.

SUMMARY OF THE INVENTION

The present invention has been made in consideration of the above situation, and improves the quality of LV display when shooting still images.

According to the present invention, provided is an image processing apparatus comprising: a reduction unit that reduces predetermined disturbance in a frame image shot by an image sensor; an estimation unit that estimates from at least one first frame image from which the disturbance is reduced, a second frame image of a point of time after the first frame image using a learning model; and an addition unit that adds the disturbance to the second frame image, wherein each unit is implemented by one or more processors, circuitry or a combination thereof.

Further, according to the present invention, provided is an image capturing apparatus comprising: an image sensor; and an image processing apparatus comprising: a reduction unit that reduces predetermined disturbance in a frame image shot by an image sensor; an estimation unit that estimates from at least one first frame image from which the disturbance is reduced, a second frame image of a point of time after the first frame image using a learning model; and an addition unit that adds the disturbance to the second frame image, wherein each unit is implemented by one or more processors, circuitry or a combination thereof.

Furthermore, according to the present invention, provided is an image processing method comprising: reducing predetermined disturbance in a frame image shot by an image sensor; estimating from at least one first frame image from which the disturbance is reduced, a second frame image of a point of time after the first frame image using a learning model; and adding the disturbance to the second frame image.

Further, according to the present invention, provided is a storage medium storing a program that causes a computer to function as each mean of an image processing apparatus comprising: a reduction unit that reduces predetermined disturbance in a frame image shot by an image sensor; an estimation unit that estimates from at least one first frame image from which the disturbance is reduced, a second frame image of a point of time after the first frame image using a learning model; and an addition unit that adds the disturbance to the second frame image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 8A and 8B are views for explaining a learning method of a learning model used in a disturbance addition processing according to the modification of the first embodiment;

FIGS. 9A and 9B are diagrams for explaining a learning method of a learning model used in an estimated image generator according to a second embodiment;

FIGS. 12A and 12B are diagrams for explaining a learning method of a learning model used in an estimated image generator according to a third embodiment;

DESCRIPTION OF THE EMBODIMENTS

Figure 1:
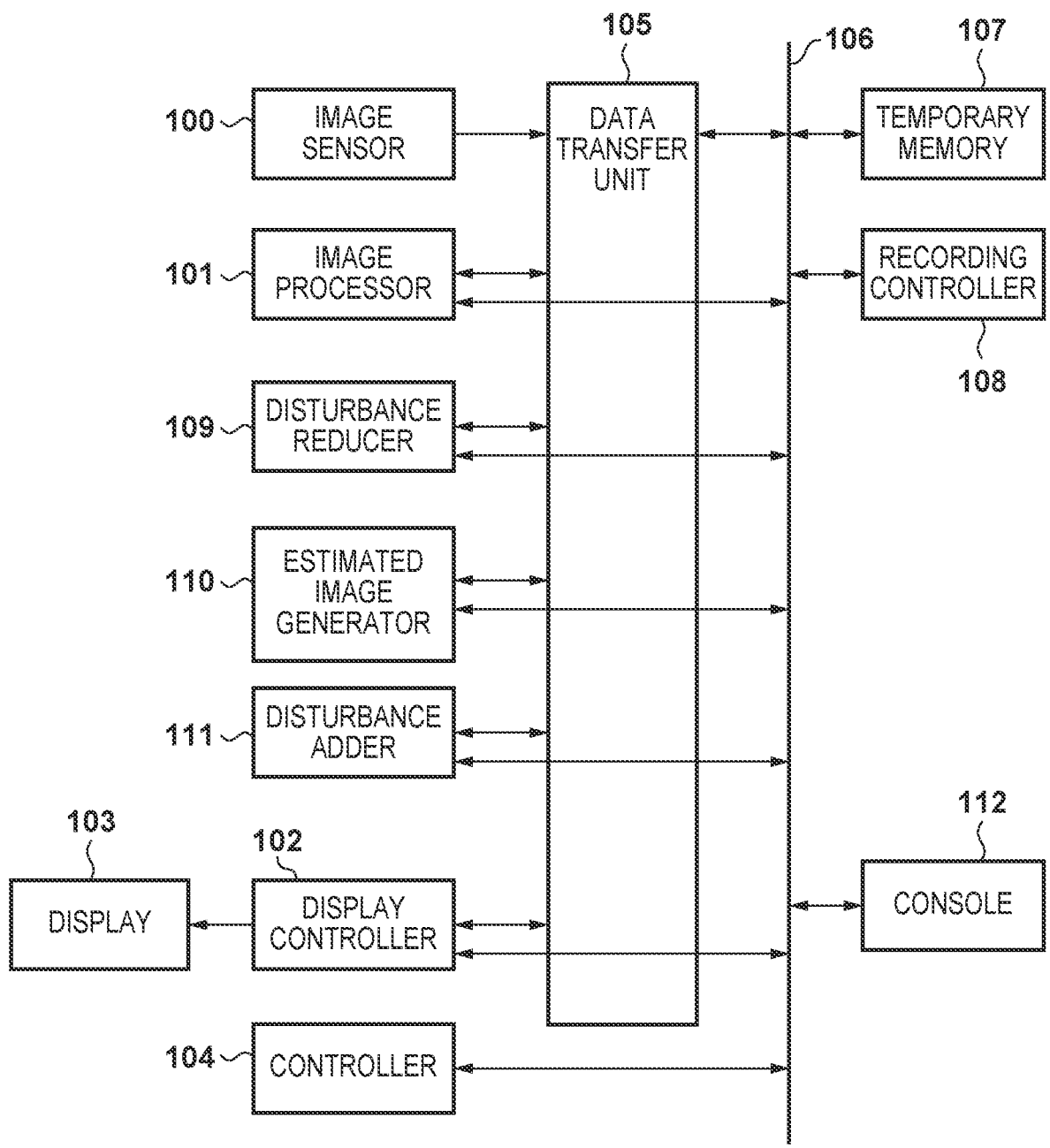
FIG. 1 is a block diagram showing a schematic configuration of an image capturing apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Hereinafter, a first embodiment of the present invention will be described. In this embodiment, the case where the present invention is applied to an image capturing apparatus will be described. Further, although the image capturing apparatus is described as a digital camera, the present invention can be applied to various image capturing apparatuses such as a digital video camera, a smartphone, a camera-equipped mobile phone, and a dashboard camera.

FIG. 1 is a block diagram showing a configuration example of a digital camera according to a first embodiment.

In FIG. 1, an image sensor 100 is an image sensor such as a CCD or a CMOS sensor, and converts a received optical subject image into an electric signal (pixel signals) and outputs it. The pixel signals output from the image sensor 100 are written in a temporary memory 107 via a data transfer unit 105.

An image processor 101 receives the pixel signals from the temporary memory 107 via the data transfer unit 105, performs image processing, and generates image data. The image processing performed by the image processor 101 includes a plurality of processes, such as pixel correction, black level correction, shading correction, defect correction, white balance adjustment, correction for chromatic aberration of magnification, gamma correction, luminance/color generation processing, geometric deformation, noise reduction, scaling, and so forth. In addition, the image processor 101 detects evaluation values such as an average luminance, a histogram, and a motion amount for each divided area of the image or the entire image, and a subject area in order to appropriately perform the image processing then, the image processor 101 acquires evaluation values such as the average brightness, the histogram, and the amount of movement of the subject area. These evaluation values are used, for example, for white balance adjustment, correction for chromatic aberration of magnification, gamma correction, luminance/color generation processing, and the like. The image data generated by the image processor 101 is recorded in the temporary memory 107 via the data transfer unit 105.

A display controller 102 is connected to the data transfer unit 105, receives image data processed by the image processor 101 or image data processed by a disturbance adder 111, which will be described later, via the data transfer unit 105, and controls a display 103 to display the image data on it. The display controller 102 adjusts the brightness and color of the image data as necessary, executes a plurality of processes such as format conversion suitable for the display 103, and transfers a display image to the display 103. Here, for example, a process of adding pixels of a fixed color to the periphery of the image in order to fit to the screen size of the display 103, and a process of embedding the shooting time and so forth in the image data are performed. Further, the display controller 102 also performs processing for superimposing so-called OSD (On-Screen Display) images.

The display 103 is, for example, an LCD (Liquid Crystal Display) or an EVF (Electric View Finder), and displays an image transferred from the display controller 102 according to a display V (vertical) sync signal described later.

A console 112 detects a user operation on a plurality of operation members (not shown) and sends a signal indicating the operation content to a controller 104 via a bus 106. The plurality of operation members include a shutter release button for instructing shooting of a still image, and a switch SW1 is turned on by the first stroke (for example, half-press) of the shutter release button and an instruction to prepare for shooting a still image is given. Further, a switch SW2 is turned on by a second stroke (for example, full press) of the shutter release button, and an instruction to shoot a still image is given. If the switch SW2 is kept in the ON state, continuous shooting of still images is instructed while the ON state is kept.

The controller 104 is composed of a microcomputer and the like, controls the operation of the entire digital camera, gives various instructions to each functional block forming the digital camera, and executes various control processes. More specifically, the controller 104 controls the image processor 101, the display controller 102, the data transfer unit 105, the temporary memory 107, a recording controller 108, a disturbance reducer 109, an estimated image generator 110, and the disturbance adder 111, which are connected via the bus 106. The controller 104 realizes each process of the present embodiment by executing the program recorded in the recording controller 108.

The data transfer unit 105 is composed of WRDMAC and RDDMAC (not shown) of a plurality of Direct Memory Access controllers (DMAC) that perform data transfer. The image data is output to the bus 106 by WRDMAC and temporarily stored in the temporary memory 107. The image data stored in the temporary memory 107 is output to the bus 106 by the RDDMAC, and is appropriately output to the image processor 101, the display controller 102, the disturbance reducer 109, the estimated image generator 110, and the disturbance adder 111 which are connected to the data transfer unit 105.

The bus 106 is composed of a system bus and a data bus, and each has an independent bus configuration.

The temporary memory 107 is composed of a memory controller and a memory, and writes data to the memory and reads data from the memory according to an instruction from the controller 104 or the data transfer unit 105. The memory is a storage device having a sufficient storage capacity to store a predetermined number of still images, a moving image for a predetermined time, data such as sound, constants for operation of the controller 104, programs, and the like, and composed of DRAM or the like, for example. Further, the memory can be composed of a plurality of memories.

The recording controller 108 is composed of a non-volatile memory controller and a non-volatile memory (not shown). The non-volatile memory controller writes data to the non-volatile memory or reads data from the non-volatile memory according to an instruction from the controller 104. The non-volatile memory is an electrically erasable/recordable memory, and for example, an EEPROM or the like may be used. The non-volatile memory stores constants for operating the controller 104, programs, and the like.

The disturbance reducer 109 is connected to the data transfer unit 105, and receives the image data which undergone image processes by the image processor 101 and is temporarily stored in the temporary memory 107 via the data transfer unit 105. Then, the disturbance reducer 109 performs processes to suppress noise, blurring, chromatic aberration, decrease in marginal illumination, distortion, and expansion/contraction which vary depending on shooting conditions such as the position of a focus lens and the position of the zoom lens, where the lenses are included in an imaging optical system (not shown), an aperture value, an exposure period of the image sensor 100, and sensitivity change. The disturbance reducer 109 also has a gyro sensor and means for detecting change in the captured image in the time direction, such as motion vector detection and brightness change detection for the captured image, and performs processes for suppressing camera shake, blur of a moving body, fluctuation of brightness, or the like are performed. Note that a known image processing method may be used as a disturbance reduction method.

For example, reduction of noise is realized by noise reduction processing based on a low-pass filter, suppression of blur is realized by blur suppression processing by a lens simulator based on lens characteristics, and suppression of chromatic aberration is realized by position correction processing for each color based on a distance from the center of image height which is a lens characteristic. In addition, suppression of decrease in marginal illumination is realized by image plane brightness correction processing based on the characteristics of decrease in marginal illumination due to the lens characteristics, and suppression of distortion is realized by geometrical deformation correction processing of an image based on the distortion characteristic of image plane which is a lens characteristic. As for camera shake, the image shake amount between frames is calculated from the shake amount obtained from the gyro sensor, and geometrically corrected. With respect to blur of a moving body, a moving amount of the moving body is obtained by detecting vector, and sharpness processing having a directional characteristic, for example, in a direction in which blur of the moving body is to be suppressed, is performed. Regarding fluctuation of brightness, the brightness change amount is obtained from the brightness value of an image, and digital gain processing or re-gamma correction processing, for example, is performed based on the obtained brightness change amount.

Then, the disturbance reducer 109 records the image data subjected to the disturbance reduction processing in the temporary memory 107 via the data transfer unit 105.

The estimated image generator 110 is connected to the data transfer unit 105, and receives image data of a disturbance-reduced frame image stored temporarily in the temporary memory 107, or image data of a frame image generated by estimation via the data transfer unit 105. Then, using a learning model, a frame image at a certain point of time is generated by estimation from a disturbance-reduced frame image which is obtained from the image captured before the point of time or a frame image generated by estimation. The frame image newly generated by estimation by the estimated image generator 110 is used as an original image of a substitute frame of a frame in which an image for display cannot be obtained due to shooting of a still image as described later. The estimated image generator 110 records the image data of the newly generated frame image in the temporary memory 107 via the data transfer unit 105.

The disturbance adder 111 is connected to the data transfer unit 105, and receives the image data of the frame image generated by the estimated image generator 110 and temporarily stored in the temporary memory 107 via the data transfer unit 105. Then, the disturbance adder 111 performs processing of adding the noise, blurring, chromatic aberration, decrease in marginal illumination, distortion, expansion/contraction, camera shake in the time axis direction, blur of a moving body, and brightness change to the input image. A known image processing method may be used as each disturbance addition method.

For example, addition of noise is realized by a process of adding noise based on a Gaussian distribution of a certain variance due to image shooting conditions such as sensitivity and sensor characteristics, and addition of blur is realized by blur addition processing by a lens simulator based on lens characteristics. Further, addition of chromatic aberration is realized by position correction processing for each color based on a distance from the center of image height, which is the lens characteristic. In addition, addition of decrease in marginal illumination is realized by image plane brightness correction processing based on the characteristics of decrease in marginal illumination due to the lens characteristics, and addition of distortion is realized by geometrical deformation correction processing of an image based on the distortion characteristic of image plane which is the lens characteristic. As for camera shake, the image shake amount between frames is calculated from the shake amount obtained from the gyro sensor, and geometrically added. With respect to blur of a moving body, a moving amount of the moving body is obtained by detecting vector, and low-pass processing having a directional characteristic, for example, in a direction in which blur of the moving body is to be added, is performed. Regarding fluctuation of brightness, the brightness change amount is obtained from the brightness value of an image, and the obtained brightness change amount is added as disturbance by the digital gain processing or re-gamma correction processing, for example.

It should be noted that these detected changes may be common to the detection information obtained by the disturbance reducer 109.

Then, the disturbance adder 111 records the image data subjected to the disturbance addition processing in the temporary memory 107 via the data transfer unit 105.

Although not shown, an AD converter that converts an analog signal from the image sensor 100 into a digital signal, a compression/expansion unit that compresses image data into, for example, image data of JPEG or MPEG format, or expands the compressed data, and an external recording controller for recording JPEG or MPEG data on an external medium.

Next, learning processing of a learning model 208 used in the estimated image generator 110 will be described with reference to FIG. 2. Reference numeral 201 denotes a training moving image that is periodically shot at a certain frame rate, and is composed of a plurality of frame images arranged in time series from left to right. Here, the (N−2)th frame image, the (N−1)th frame image, and the Nth frame image will be described as examples.

First, the disturbance reducer 109 performs disturbance reduction processing 202, 203, and 204 on the (N−2)th frame image, the (N−1)th frame image, and the Nth frame image, respectively, and generates frame images 205, 206 and 207. The disturbance here refers to a disturbance peculiar to the training moving image 201, and includes noise, blurring, chromatic aberration, decrease in marginal illumination, distortion, and expansion/contraction that vary depending on shooting conditions such as the position of the focus lens, the position of the zoom lens, the aperture value, the exposure period of the image sensor 100, and the sensitivity change. The disturbance also includes camera shake, blur of a moving body, and brightness changes.

The learning model 208 is a learning model that performs machine learning and is used in the estimated image generator 110, and is a known neural network model, for example. As an example of the learning model 208, temporally continuous two frame images are input, and a frame image of the next frame with respect to the input two frame images is estimated and output. Here, the disturbance-reduced (N−2)th frame image 205 and the disturbance-reduced (N−1)th frame image 206 are input, and the disturbance-reduced Nth frame image 207 is used as training data during learning. The learning model 208 updates itself based on an error between the estimated frame image of the Nth frame and the disturbance-reduced Nth frame image 207 as the training data that is an expected value.

Similarly, the disturbance-reduced (N−1)th frame image 206 and the disturbance-reduced Nth frame image 207 are input, and the learning model 208 is updated based on an error between an estimated frame image of the (N+1)th frame and the disturbance-reduced (N+1)th frame image as the training data that is an expected value.

In this way, the learning model 208 can learn repeatedly by repeatedly using frame images of the training moving image 201 as the input frame images and training data while shifting the frame images to be used. Also, by using various moving images that are close to the actual shooting scene as the training moving image 201, it is possible to create the highly accurate learning model 208. At this time, learning is performed after reducing the disturbance depending on the conditions of the moving image shooting of the training moving image 201, so that it is possible to obtain a learning model capable of generating a highly accurate estimated image that does not depend on the disturbance caused by the shooting conditions. In the present embodiment, learning is not performed during shooting, but is performed in advance, and the weighting data of each edge and so on is stored as learning parameters in the recording controller 108.

Next, with reference to FIG. 3, a process of generating an estimated image by the estimated image generator 110 according to this embodiment will be described.

A reference numeral 301 denotes an image of each frame continuously shot for live view (LV) display at a certain frame rate (hereinafter, referred to as "LV image"), and a plurality of LV images are arranged in time series from left to right in the figure. If shooting of a still image starts while shooting LV images, shooting of an LV image cannot be performed because the image sensor 100 is used to shoot the still image, and a frame or frames will be lost. In this case, an LV image that is a substitute for the LV image of the missing frame is generated using the learned learning model 208 obtained as described above.

Figure 3:
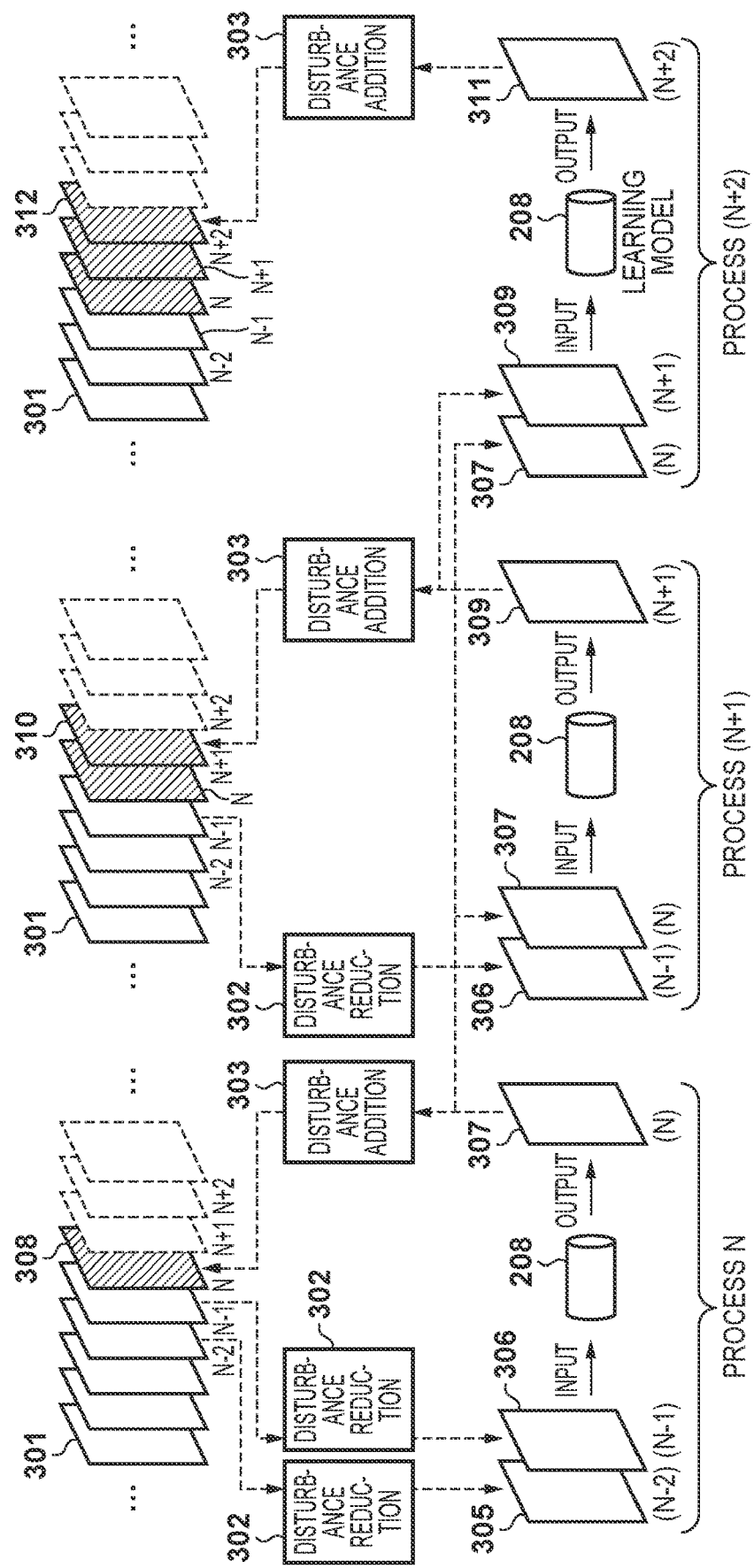
FIG. 3 is a diagram for explaining a substitute image generation processing using the learning model by the estimated image generator according to the first embodiment.

In FIG. 3, a process N shows the concept of generating an LV image of the missing Nth frame from a captured LV image of the (N−2)th frame and an LV image of the (N−1)th frame.

First, the disturbance reducer 109 performs the disturbance reduction processing 302 on the LV image of the (N−2)th frame and the LV image of the (N−1)th frame to generate a disturbance-reduced LV image 305 of the (N−2)th frame and a disturbance-reduced LV image 306 of the (N−1)th frame. The estimated image generator 110 receives the disturbance-reduced LV image 305 of the (N−2)th frame and the disturbance-reduced LV image 306 of the (N−1)th frame, estimates an estimated LV image 307 of the Nth frame using the learning model 208, and outputs it. Then, the estimated LV image 307 of the Nth frame is subjected to the disturbance addition processing 303 by the disturbance adder 111 to generate a substitute LV image 308 of the missing Nth frame.

A process (N+1) shows the process in a case where LV images are lost in two consecutive frames. Here, a concept of generating a substitute LV image of the missing (N+1)th frame from the estimated LV image 307 of the Nth frame estimated in the process N and the captured and disturbance-reduced LV image 306 of the (N−1)th frame is shown.

First, the disturbance reduction processing 302 is performed on the LV image of the (N−1)th frame by the disturbance reducer 109 to generate the disturbance-reduced LV image 306 of the (N−1)th frame. Note that the disturbance-reduced LV image 306 of the (N−1)th frame generated in the process N may be used instead. The estimated image generator 110 receives the disturbance-reduced LV image 306 of the (N−1)th frame and the estimated LV image 307 of the Nth frame estimated by the process N, estimates an estimated LV image 309 of the (N+1)th frame by using the learning model 208, and outputs it. Then, the estimated LV image 309 of the (N+1)th frame is subjected to the disturbance addition processing 303 by the disturbance adder 111, and a substitute LV image 310 of the missing (N+1)th frame is generated.

A process (N+2) indicates a case where LV images are lost in three consecutive frames. Here, a concept of generating a substitute LV image of the missing (N+2)th frame from the estimated LV image 307 of the Nth frame estimated in the process N and the estimated LV image 309 of the (N+1)th frame estimated in the process (N+1) is shown.

The estimated image generator 110 receives the estimated LV image 307 of the Nth frame estimated in the process N and the estimated LV image 309 of the (N+1)th frame estimated in the process (N+1), estimates an estimated LV image 311 of the (N+2)th frame using the learning model 208, and outputs it. Then, the disturbance addition processing 303 is performed by the disturbance adder 111 on the estimated LV image 311 of the (N+2)th frame, and a substitute LV image 312 of the missing (N+2)th frame is generated.

As described above, even if the images of the Nth, (N+1)th, and (N+2)th frames are continuously lost in time sequence, the substitute LV image 308 of the Nth frame, the substitute LV image 310 of the (N+1)th frame, and the substitute LV image 312 of the (N+2)th frame can be generated by using the learning model. Then, following the LV images of the (N−2)th and (N−1)th frames, the substitute LV image 308 of the Nth frame, the substitute LV image 310 of the (N+1)th frame, and the substitute LV image 312 of the (N+2)th frame are sequentially displayed on the display 103 via the display controller 102.

Figure 2:
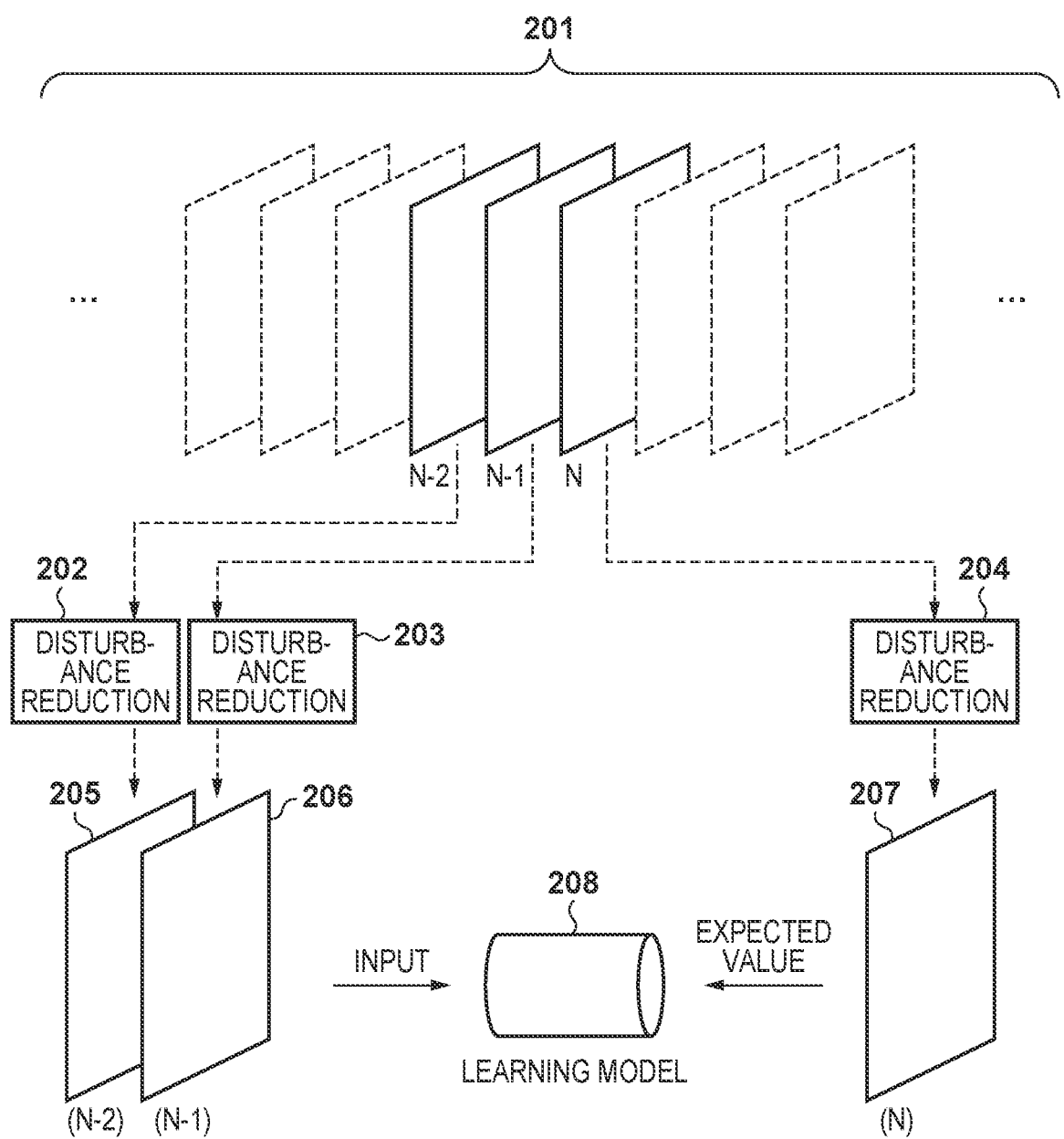
FIG. 2 is a diagram for explaining a learning method of a learning model used in an estimated image generator according to a first embodiment.

It should be noted that in the example shown in FIGS. 2 and 3, the learning model in which two continuous frame images are input and the next frame is output is described as an example, but the present invention is not limited to this. For example, a learning model in which one frame image or three or more frame images are input may be used. Also, the frame image to be estimated is not limited to of the next continuous frame, but may be of a frame between frames, or of frames at certain points in time that are not continuous. However, the timings of inputting/outputting frame images in the learning model at the time of learning are the same for the learning model at the time of generating an estimated image.

Figure 4:
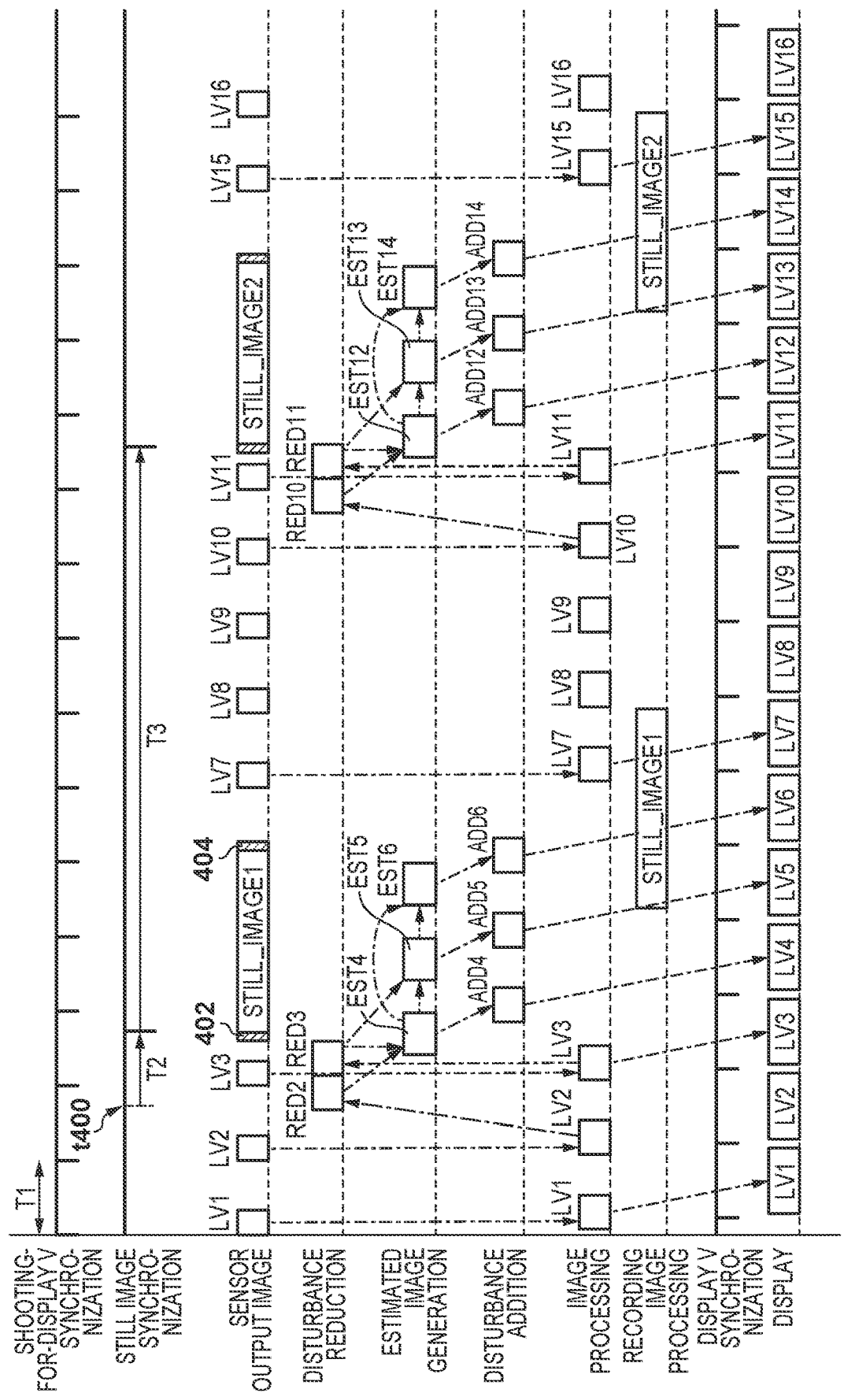
FIG. 4 is a timing chart for explaining LV images when continuous shooting of still images is performed during LV display according to the first embodiment.

FIG. 4 is a timing chart in a case where still images are continuously shot during LV display in the first embodiment. Timing signals and processes performed at the same timing are aligned in the vertical direction, and the horizontal direction shows time.

In FIG. 4, "shooting V synchronization" indicates timings of a vertical synchronization signal for shooting LV images by the image sensor 100, and T1 indicates the period of the shooting V synchronization. The shooting V synchronization is a synchronization signal showing the timings for outputting images of 60 frames per second (60 fps), for example.

"Still image synchronization" indicates drive timings for shooting still images by the image sensor 100, and more specifically, is a synchronization signal showing the timing of shooting the first still image, and the timings of shooting the second and subsequent still images that occur at every shooting interval T3. Timing t400 indicates the timing at which the switch SW2 is turned on by the user pressing the shutter release button, and the still image synchronization signal is generated after a release time lag T2.

"Sensor output image" indicates shooting periods from the start of charge accumulation of images in the image sensor 100 to the end of reading the accumulated charge, and the sensor switching time. Here, the shooting periods of the LV images are represented as LV1 to LV3, LV7 to LV11, LV15 and LV16, and the shooting periods of the still images are represented as STILL_IMAGE1 and STILL_IMAGE2. Further, a frame 402 indicates a switching time for switching the driving of the image sensor 100 to shoot a still image from to shoot an LV image, and a frame 404 indicates a switching time for switching the driving of the image sensor 100 to shoot an LV image from to shoot the still image. The shooting period of an LV image is different from the shooting period of a still image because the number of pixels to be read out is different, the exposure period is different, and so on. Needless to say, the number of pixels of a still image is larger than the number of pixels of an LV image, and the exposure period of the still image is usually longer than the exposure period of the LV image.

"Image processing" indicates timings of image processing for display performed on LV images in the image processor 101, and "recording image processing" indicates timings of image processing for recording performed on still images. Here, the image processing periods of the LV images are represented as LV1 to LV3, LV7 to LV11, LV15, and LV16, and the image processing periods of the still images are represented as STILL_IMAGE1 and STILL_IMAGE2. In each of the image processing periods shown by LV1 to LV3, LV7 to LV11, LV15, and LV16, and STILL_IMAGE1 and STILL_IMAGE2, first, the pixel signals recorded in the temporary memory 107 are transferred to the image processor 101 via the data transfer unit 105. Then, image processing is performed on the read pixel signals by the image processor 101, and the obtained image data is recorded again on the temporary memory 107 via the data transfer unit 105.

Further, LV1 to LV3, LV7 to LV11, LV15, and LV16 in the "image processing" and STILL_IMAGE1 and STILL_IMAGE2 in the "recording image processing" show that the image processor 101 starts processing pixel signals before all the pixel signals for one screen from the image sensor 100 are recorded in the temporary memory 107. The data transfer unit 105 controls so that only the pixel signals read out from the image sensor 100 is read out to the image processor 101. In other words, the image processor 101 is controlled so that it does not read out the pixel signals before the pixel signals from the image sensor 100 are written to the temporary memory 107. Since a still image has more pixels than an LV image, the time taken to process the still image is longer than the time taken to process the LV image. Further, it is assumed that the LV image is preferentially processed and, in the overlapping periods of LV7 and STILL_IMAGE1 and of LV15 and STILL_IMAGE2 in FIG. 4, the image processor 101 is controlled such that the image processing of the still image is temporarily suspended during the processing of the LV image is performed, and the image processing of the still image is resumed after the processing of the LV image is completed.

At timing t400, when the user operates the shutter release button to turn on SW2 and STILL_IMAGE1 and STILL_IMAGE2 after the shooting interval T3 are shot, the LV image shooting is interrupted. Accordingly, substitute LV images of the missing LV images (corresponding to LV4, LV5, LV6 and LV12, LV13, LV14), which are determined from the exposure period which is the shooting condition of the still image, are generated by performing the disturbance reduction, the estimated image generation, and the disturbance addition described above with reference to FIG. 3.

"Disturbance reduction" indicates timings of disturbance reduction processing performed by the disturbance reducer 109. Here, the timings to perform the disturbance reduction on the LV images processed at the timings of LV2, LV3, LV10, and LV11 of the "image processing" are indicated by RED2, RED3, RED10, and RED11. The process of RED2 is started after timing t400. The disturbance reducer 109 reads the LV image that has undergone the image processing and is stored in the temporary memory 107 by the image processor 101 via the data transfer unit 105, performs the disturbance reduction processing, and then records the disturbance-reduced LV image in the temporary memory 107 via the data transfer unit 105.

"Estimated image generation" indicates timings of the estimated image generation processing using the learning model 208 performed by the estimated image generator 110. EST4 indicates a timing of estimating a missing LV image corresponding to LV4, and the estimated image generator 110 first reads out the disturbance-reduced LV images processed at timings RED2 and RED3 from the temporary memory 107 via the data transfer unit 105. Then, using the read LV images as inputs, estimation using the learning model 208 is performed to generate an estimated LV image corresponding to LV4, and the generated estimated LV image is stored in the temporary memory 107 via the data transfer unit 105.

EST5 indicates a timing of estimating a missing LV image corresponding to LV5, and the estimated image generator 110 first reads out the estimated LV image estimated at timing EST4 and the disturbance-reduced LV image processed at timing RED3 from the temporary memory 107 via the data transfer unit 105. Then, using the read LV images as inputs, estimation using the learning model 208 is performed to generate an estimated LV image corresponding to LV5, and the generated estimated LV image is stored in the temporary memory 107 via the data transfer unit 105.

Similarly, EST6 indicates a timing of estimating a missing LV image corresponding to LV6, and the estimated image generator 110 first reads out the estimated LV images estimated at timings EST4 and EST5 from the temporary memory 107 via the data transfer unit 105. Then, using the read estimated LV images as inputs, estimation using the learning model 208 is performed to generate an estimated LV image corresponding to LV6, and the generated estimated LV image is stored in the temporary memory 107 via the data transfer unit 105.

EST12 indicates a timing of estimating a missing LV image corresponding to LV12, and the same process as for EST4 described above is performed. EST13 indicates a timing of estimating a missing LV image corresponding to LV13, and the same process as for EST5 described above is performed. Similarly, EST14 indicates a timing of estimating a missing LV image corresponding to LV14, and the same process as for EST6 described above is performed.

"Disturbance addition" indicates timings of disturbance addition processing performed by the disturbance adder 111. Here, timings for adding disturbance to the image data of the estimated LV images estimated at timings EST4, EST5, EST6, EST12, EST13 and EST14, are shown as ADD4, ADD5, ADD6, ADD12, ADD13 and ADD14, respectively. The disturbance adder 111 first reads out an estimated LV image stored in the temporary memory 107 by the estimated image generator 110 via the data transfer unit 105. Then, after performing the disturbance addition processing on the read estimated LV image, the disturbance-added substitute LV image is written to the temporary memory 107 via the data transfer unit 105.

"Display V synchronization" indicates a vertical sync signal for starting display on the display 103, and is a sync signal showing timings for displaying images of 60 frames per second (60 fps), for example. The "display V synchronization" is set so that the time lag since an LV image is read at the timing indicated by the "sensor output image" until the LV image is displayed on the display 103 becomes shortest in the system. That is, the vertical sync signal of the "display V synchronization" is generated after a delay of a certain period of time since the vertical sync signal of the "shooting V synchronization" is generated.

"Display" indicates timings of displaying the images processed by the display controller 102 and the substitute LV images on the display 103. Normally, image processing is performed at a timing according to the "display V synchronization", and a displayed image is updated by reading out the image data of the image-processed LV images corresponding to LV1 to LV3, LV7 to LV11, LV15, and LV16 stored in the temporary memory 107. On the other hand, at the timing when the still image shooting is started and the LV images cannot be captured, a displayed image is updated by reading out the substitute LV images corresponding to LV4 to LV6 and LV 12 to LV 14 to which disturbance is added at timings ADD4 to ADD6 and ADD12 to ADD14. In this manner, it is possible to perform continuous display of LV1 to LV16 even during still image shooting is performed by using the substitute LV images corresponding to LV4 to LV6 and LV12 to LV14.

Figure 5A:
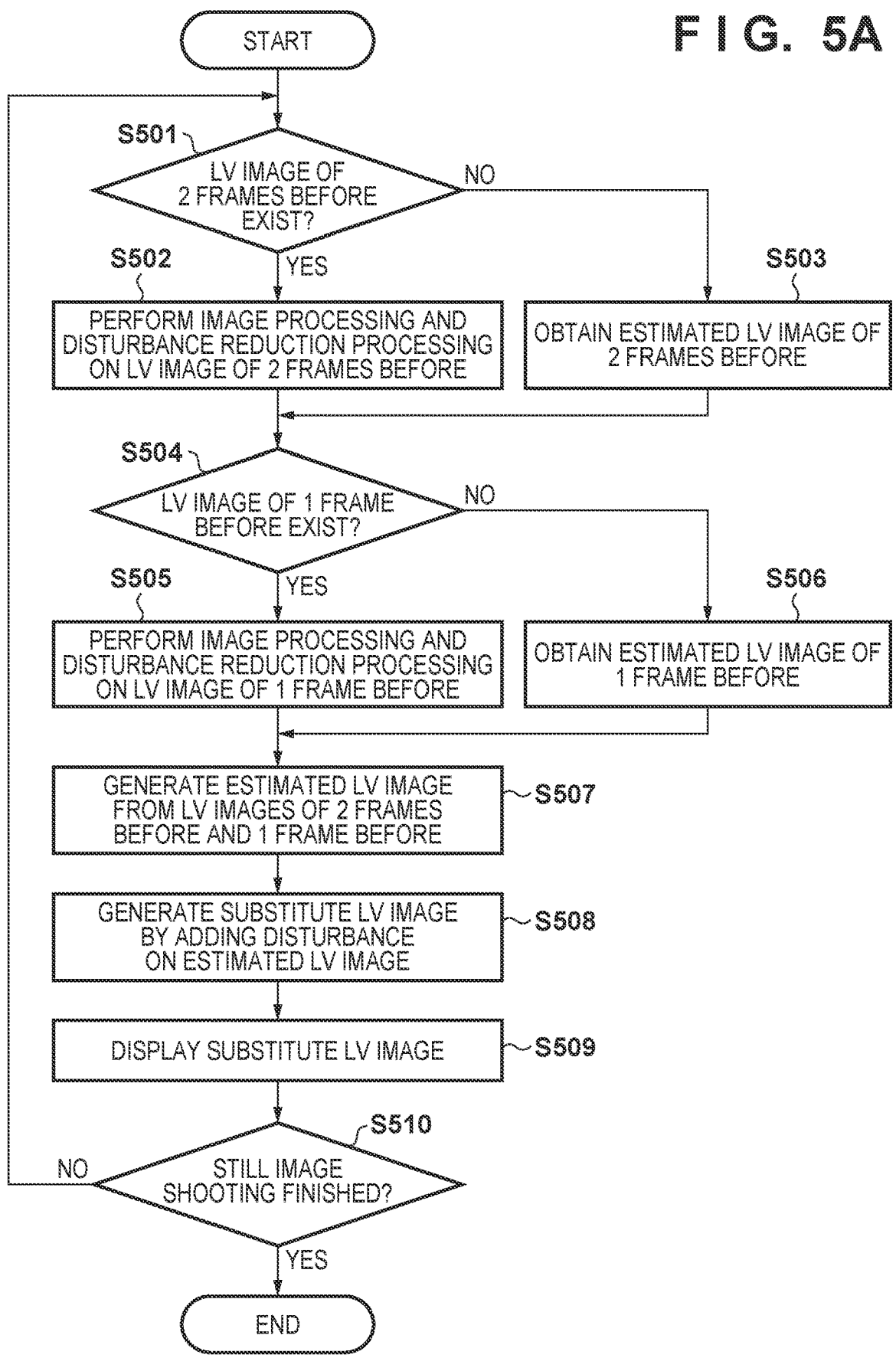
FIG. 5A is a flowchart showing generation processing of a substitute LV image in a case where the continuous shooting of still images is performed during LV display according to the first embodiment.

Next, with reference to FIGS. 5A and 5B, shooting and display processing in this embodiment will be described. FIG. 5A is a flowchart illustrating a process of generating a substitute LV image during still image shooting in a case where a still image is shot during LV display, which is controlled by the controller 104. This processing is started at the timing when the user presses the shutter release button during the LV display (that is, during LV image shooting) and the switch SW2 is turned on.

In step S501, it is determined whether there is an LV image of two frames before. If yes, the process proceeds to step S502, and if no, the process proceeds to step S503.

In step S502, the LV image of two frames before is subjected to image processing by the image processor 101, and the processed LV image is further subjected to disturbance reduction processing by the disturbance reducer 109, and the process proceeds to step S504.

On the other hand, in step S503, an estimated LV image of two frames before generated by the estimated image generator 110 is acquired, and the process proceeds to step S504.

In step S504, it is determined whether there is an LV image of one frame before. If yes, the process proceeds to step S505, and if no, the process proceeds to step S506.

In step S505, the LV image of one frame before is subjected to the image processing by the image processor 101, and the processed LV image is further subjected to the disturbance reduction processing by the disturbance reducer 109, and the process proceeds to step S507.

On the other hand, in step S506, an estimated LV image of one frame before generated by the estimated image generator 110 is acquired, and the process proceeds to step S507.

In step S507, the estimated image generator 110 receives the disturbance-removed LV images or estimated LV images of two frames before and one frame before acquired in steps S501 to S506 as inputs, estimates and generates an estimated LV image of the current frame using the learning model 208.

Next, in step S508, the estimated LV image estimated in step S507 is subjected to disturbance addition processing by the disturbance adder 111, and a substitute LV image for LV display of the current frame is generated.

In step S509, the substitute LV image generated in step S508 is displayed on the display 103 via the display controller 102.

In step S510, it is determined whether or not the still image shooting is completed. Here, it is determined whether the shooting of the still image is finished and the shutter release button is not pressed by the user. If not finished, the process returns to step S501 to repeat the above processes, and if finished, the processing ends.

As described above, a series of processes is repeatedly performed until the still image shooting is finished. As a result, even during the period when the LV image cannot be captured due to the still image shooting, the LV display can be continued without causing a phenomenon such as a blackout or screen freeze caused by continuous display of the same image.

Figures 5B, 6:
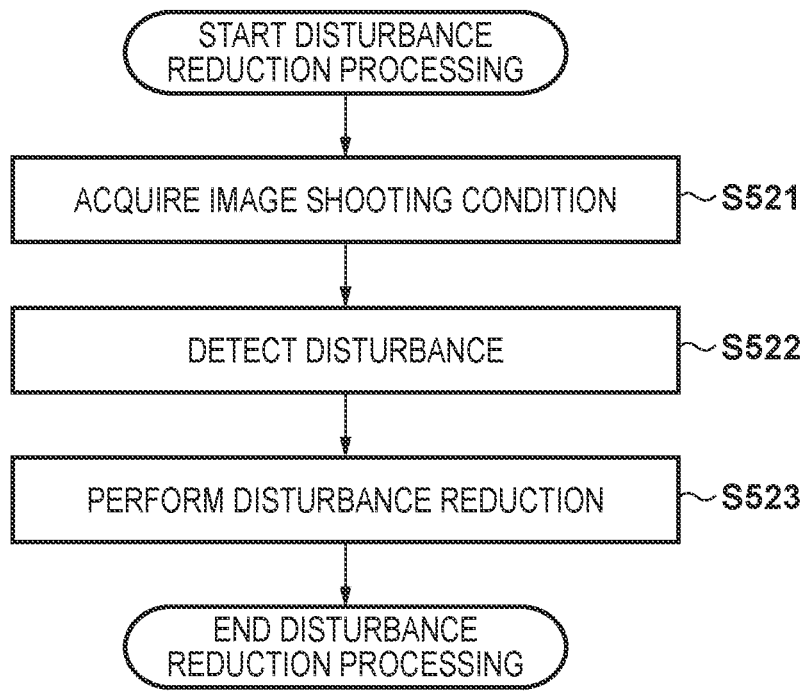
FIG. 5B is a flowchart showing a disturbance reduction processing according to the first embodiment.
FIG. 6 is a diagram showing a relationship between a display frame rate for LV display and a frame rate during learning a learning model according to the first embodiment.

FIG. 5B is a flowchart illustrating the disturbance reduction processing performed by the disturbance reducer 109 in steps S502 and S505.

In step S521, the current shooting conditions such as the position of the focus lens, the position of the zoom lens, the aperture value, the exposure period of the image sensor 100, and the ISO sensitivity are acquired. Actually, since no LV image is captured at this timing, the shooting conditions at the time of shooting the immediately previous LV image are acquired. Further, in the case where the lens and the diaphragm are dynamically controlled, the shooting conditions may be corrected based on predicted positions of the lens and diaphragm.

In step S522, a shake amount of the camera, a blur amount of a moving body, and a brightness change amount are detected by a gyro sensor and a unit that detects a change in the captured images in time sequence, such as vector detection and brightness change detection of the captured images.

In step S523, the disturbance reduction based on the shooting conditions acquired in step S521 and disturbance reduction based on the information detected in step S522 are performed. Based on the position of the focus lens, the position of the zoom lens, the aperture value, the exposure period of the image sensor 100, the ISO sensitivity, and the like acquired in step S521, processing for suppressing noise, blurring, chromatic aberration, decrease in marginal illumination, distortion, and expansion/contraction is performed. Further, based on the information acquired in step S522, processing for suppressing camera shake, blur of a moving body, and fluctuation of brightness is performed.

Next, the frame rate of the live view in the present embodiment will be described. The estimated image generator 110 performs learning using a training moving image of a predetermined frame rate in the learning described with reference to FIG. 2. At this time, by unifying the frame rates of the training moving images and performing the learning so that moving images of different frame rates do not mix, it is possible to generate a learning model with high estimation accuracy at that frame rate.

Furthermore, in generating an estimated image as described above with reference to FIG. 3, the estimation accuracy is better when the image shooting frame rate and the display frame rate of an LV image to be estimated match the frame rate of the training moving image during learning. In a case where the frame rate of LV display is 60 fps, for example, a learning model of 60 fps is learned using a training moving image of 60 fps, and when a substitute LV image for LV display of 60 fps is generated, the learned learning model of 60 fps is used.

Further, in a case where the frame rate of LV display differs depending on the operation mode in the same image capturing apparatus, it is preferable to prepare a learning model by learning for each different frame rate in advance. Then, in generating a substitute LV image for LV display, a learning model corresponding to the frame rate of the LV display is selected and used.

FIG. 6 is a diagram showing an example thereof. The operation modes include low-speed continuous shooting (normal), low-speed continuous shooting (power saving), high-speed continuous shooting (normal), and high-speed continuous shooting (power saving), and the display frame rates thereof are 60 fps, 30 fps, 120 fps, and 60 fps, respectively. The low-speed continuous shooting assumes a mode in which the frame rate of continuous shooting of still images is low, and the high-speed continuous shooting assumes a mode in which the frame rate of continuous shooting of still images is a high. The display frame rates differ between the normal mode and the power saving mode. Here, the frame rate of the power saving mode is set to half of the frame rate of the normal mode to reduce power consumption, and an effect of increasing the number of still images that can be taken without changing battery, or the like, is expected in the power saving mode. At this time, as for the learning model to be used in each operation mode, the learning model of 60 fps is selected and used during the low-speed continuous shooting (normal) and the learning model of 30 fps is used during the low-speed continuous shooting (power saving). Further, a learning model of 120 fps is selected and used during the high-speed continuous shooting (normal), and a learning model of 60 fps is selected and used during the high-speed continuous shooting (power saving).

According to the first embodiment as described above, even in a case where LV image shooting and LV display cannot be performed normally because the exposure periods of still images become long during continuous shooting of still images, a smooth LV display with good visibility is realized.

<Modification>

A case where the disturbance reducer 109 performs disturbance reduction processing using a learning model will be described with reference to FIGS. 7A and 7B.

Figure 7B:
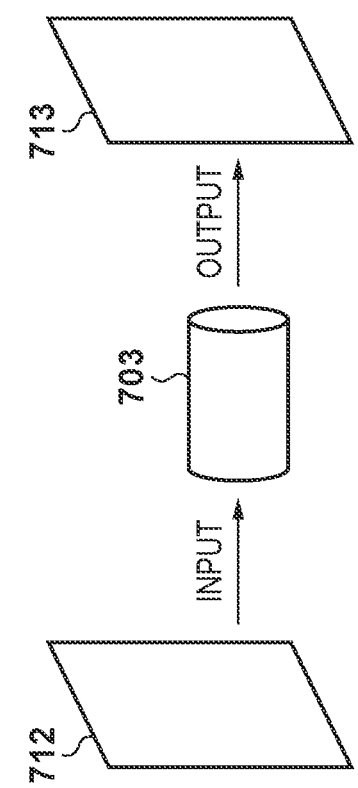
FIGS. 7A and 7B are views for explaining a learning method of a learning model used in the disturbance reduction processing according to a modification of the first embodiment.
Figure 7A:
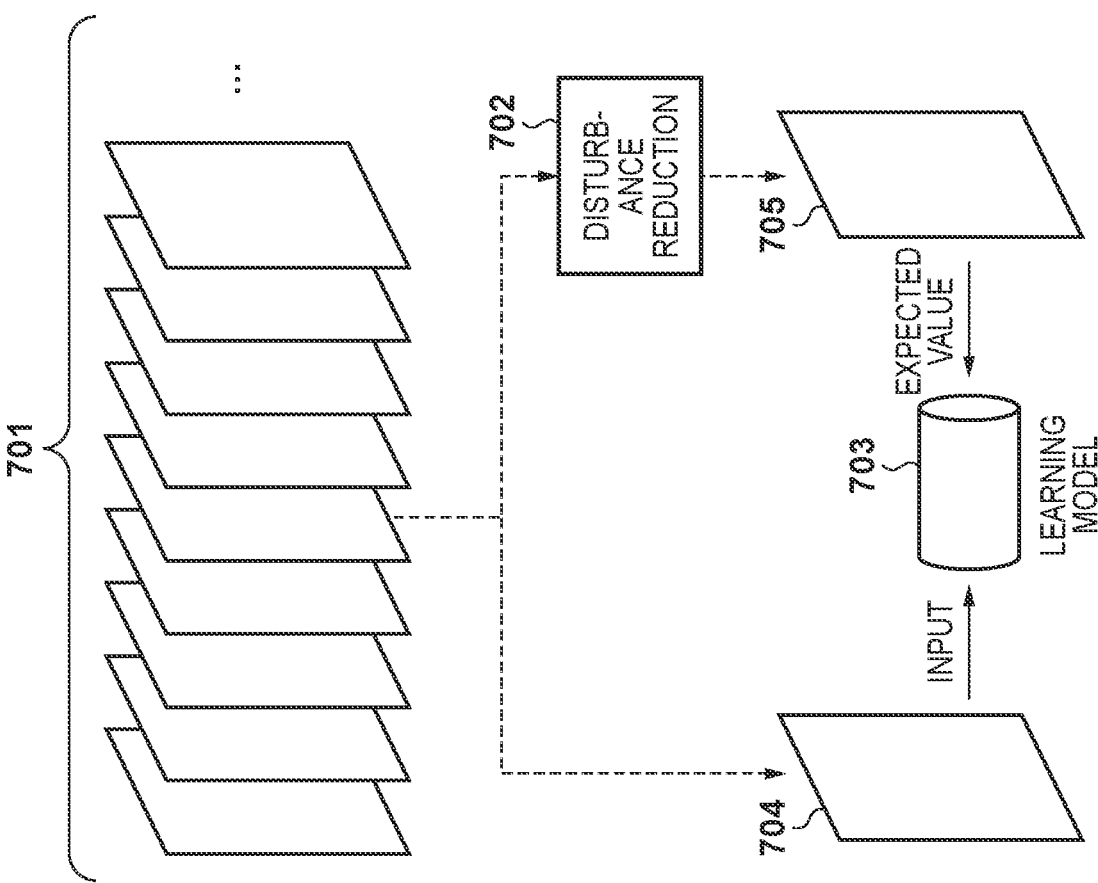

FIG. 7A is a diagram illustrating a learning method of a learning model used for the disturbance reduction processing, and reference numeral 701 indicates a training moving image captured at a certain frame rate, which includes a plurality of frame images arranged in time series from left to right. Reference numeral 702 indicates disturbance reduction processing performed by the disturbance reducer 109. A learning model 703 is a learning model that performs machine learning, and is, for example, a known neural network model. Here, as an example of the learning model 703, one frame image 704 is used as an input, and a frame image which is a disturbance-reduced input image will be generated. More specifically, one frame image of the training moving image 701 is input, and using the frame image 705 on which the disturbance reduction processing 702 has been performed as training data that is an expected value at the time of learning, the learning model 703 is updated based on the error between the frame image generated by the learning model 703 and the training data. Then, the learning model 703 can repeatedly learn by shifting the frame image of the training moving image 701 to be used as the input frame image and the training data.

FIG. 7B shows the disturbance reduction processing using the learning model 703. Reference numeral 712 denotes a frame image with disturbance, which corresponds to the LV image of the (N−2)th or (N−1)th frame obtained by image-processing the LV image 301 shown in FIG. 3. Reference numeral 713 denotes a disturbance-reduced frame image processed by using the learning model 703, which corresponds to the disturbance-reduced LV image 305 or 306 in FIG. 3. As described above, the learning model 703 can be used for the disturbance reduction processing 302 shown in FIG. 3.

Next, a case where the disturbance adder 111 performs the disturbance addition processing using a learning model will be described with reference to FIGS. 8A and 8B.

FIG. 8A is a diagram illustrating a learning method of a learning model used for the disturbance addition processing, and reference numeral 801 indicates a training moving image captured at a certain frame rate, which includes a plurality of frame images arranged in time series from left to right. Reference numeral 802 indicates the disturbance reduction processing performed by the disturbance reducer 109. A learning model 803 is a learning model that performs machine learning, and is, for example, a known neural network model. Here, as an example of the learning model 803, one disturbance-reduced frame image 804 is used as an input, and a frame image which is a disturbance-added input image is generated. More specifically, one frame image 805 of the training moving image 801 is input, and using the frame image 805 as training data that is an expected value at the time of learning, the learning model 803 is updated based on the error between a frame image generated by using the learning model 803 and the training data. Then, the learning model 803 can repeatedly learn by shifting the frame image of the training moving image 801 to be used as the input frame image and the training data.

FIG. 7B shows the disturbance addition processing using the learning model 803. Reference numeral 812 denotes a frame image with no disturbance, which corresponds to the estimated LV image 307, 309 or 311 generated by using the learning model 208 shown in FIG. 3. Reference numeral 813 denotes a disturbance-added frame image estimated and generated by using the learning model 803, which corresponds to the substitute LV image 308, 310 or 312 which have undergone the disturbance addition processing in FIG. 3. As described above, the learning model 803 can be used in the disturbance addition processing 303 shown in FIG. 3.

Second Embodiment

Next, a second embodiment of the present invention will be described. Note that the image capturing apparatus used in the second embodiment is the same as that described in the first embodiment, and description thereof will be omitted.

In the first embodiment, immediately preceding two frame images are input in generating an estimated LV image using a learning model. The second embodiment is different from the first embodiment in that not only the immediately preceding two frame images but also frame images obtained at arbitrarily different timings may be used as inputs, and frame images obtained by shooting are positively used.

Next, learning processing of a learning model used in the estimated image generator 110 in the second embodiment will be described with reference to FIGS. 9A and 9B. In FIGS. 9A and 9B, the same components as those in FIG. 2 are denoted by the same reference numerals, and the description thereof will be omitted as appropriate.

FIG. 9A shows a case where a frame image of the Nth frame is estimated by using a frame image of the (N−2)th frame and a frame image of the (N−1)th frame as inputs. Since this learning method is the same as the method described with reference to FIG. 2 in the first embodiment, description thereof will be omitted. However, in order to show the difference from the learning model B 909 described below with reference to FIG. 9B, the learning model 208 in FIG. 2 is referred to as the learning model A 908 in FIG. 9A.

Next, the learning process of the learning model B 909 will be described with reference to FIG. 9B. Here, the (N−3)th frame image, the (N−1)th frame image, and the Nth frame image will be described as examples.

First, the disturbance reducer 109 performs disturbance reduction processing 902, 903, and 904 on a frame image of the (N−3)th frame, a frame image of the (N−1)th frame, and a frame image of the Nth frame, respectively, and generates frame images 905, 906 and 907. The disturbance here refers to the disturbance that is specific to the training moving image 201, and includes noise, blurring, chromatic aberration, decrease in marginal illumination, distortion, and expansion/contraction which vary depending on the shooting conditions during moving image shooting such as the position of the focus lens, the position of the zoom lens, the aperture value, and the exposure period of the image sensor 100, and the sensitivity change. The disturbance also includes camera shake, motion blur, and brightness changes.

The learning model B 909 is a learning model that performs machine learning and is used in the estimated image generator 110, and is a known neural network model, for example. As an example of the learning model B 909, first and third frame images out of temporally continuous three frame images are input, and a frame image of the next frame with respect to the input two frame images is estimated and output. Here, the disturbance-reduced frame image 905 of the (N−3)th frame and the disturbance-reduced frame image 906 of the (N−1)th are input, and the disturbance-reduced frame image 907 of the Nth frame is used as training data during learning. The learning model B 909 updates itself based on an error between the estimated frame image of the Nth frame and the disturbance-reduced frame image 907 of the Nth frame as the training data which is an expected value.

Similarly, the disturbance-reduced frame image 906 of the (N−2)th frame and the disturbance-reduced frame image 907 of the Nth frame are input, and the learning model B 909 is updated based on an error between an estimated frame image of the (N+1)th frame and the disturbance-reduced frame image of the (N+1)th frame as the training data that is an expected value.

In this way, the learning model B 909 can learn repeatedly by repeatedly using frame images of the training moving image 201 as the input frame images and training data while shifting the frame images to be used. Also, by using various moving images that are close to the actual shooting scene as the training moving image 201, it is possible to create the learning model B 909 that can generate a highly accurate estimated image. At this time, by performing learning after reducing the disturbance depending on the conditions of the moving image shooting of the training moving image 201, it is possible to obtain a learning model capable of generating a highly accurate estimated image that does not depend on the disturbance caused by the shooting conditions. In the present embodiment, learning is not performed during shooting, but is performed in advance, and the weighting data of each edge and so on is stored as learning parameters in the recording controller 108.

Next, with reference to FIG. 10, a process of generating an estimated image by the estimated image generator 110 using the learning model A 908 and the learning model B 909 according to this embodiment will be described. Note, in FIG. 10, the same parts as those in FIG. 3 are designated by the same reference numerals, and the description thereof will be omitted as appropriate.

If shooting of a still image starts while shooting LV images, shooting of LV images cannot be performed because the image sensor 100 is used to shoot the still image, and some frames will be lost. In this case, an LV image that is a substitute for the LV image of the missing frame is generated using the learned learning model A 908 and learning model B 909 obtained as described above.

Figure 10:
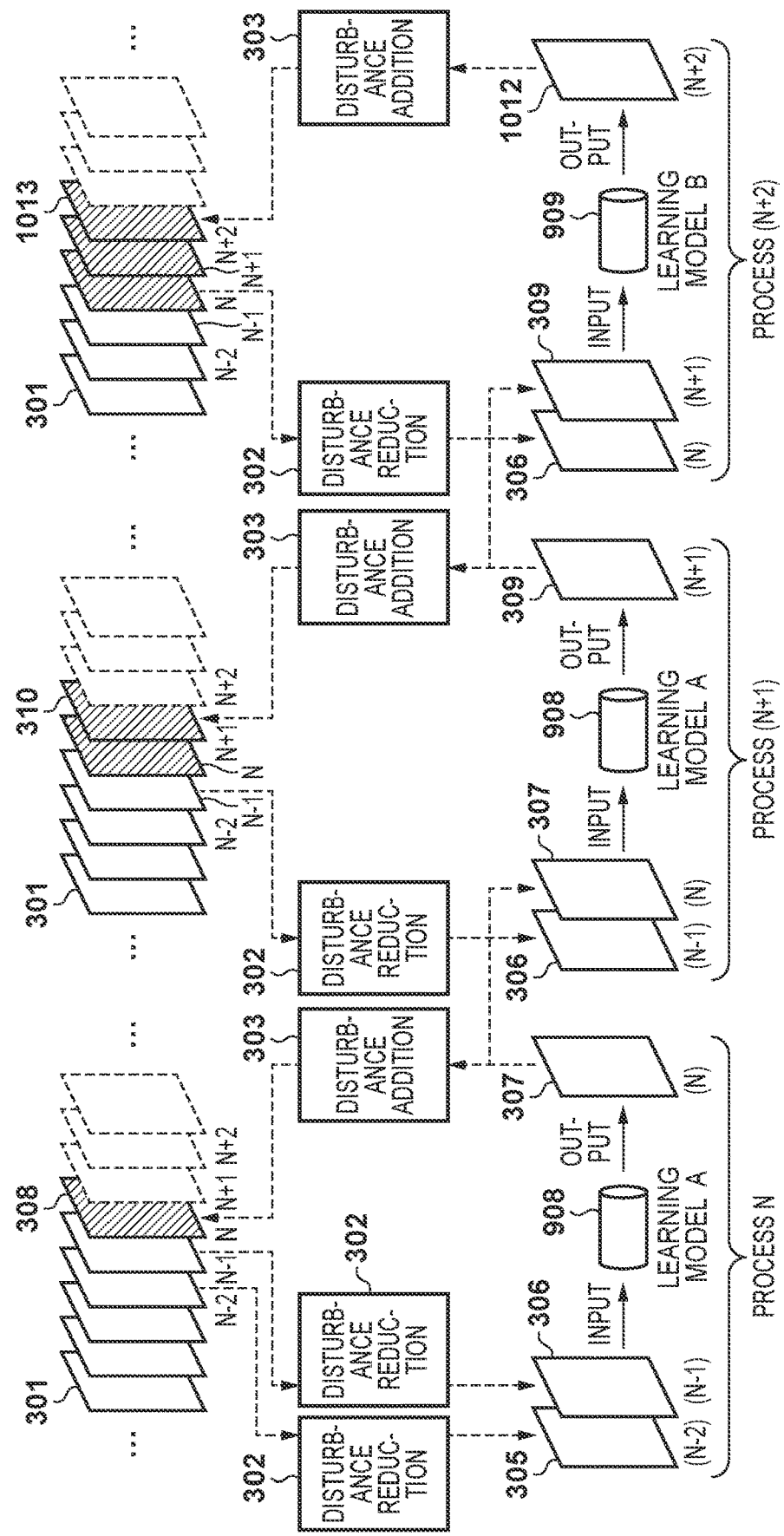
FIG. 10 is a diagram for explaining a substitute image generation processing using the learning model by the estimated image generator according to the second embodiment.

In FIG. 10, a process N shows the concept of generating an LV image of the missing Nth frame from a captured LV image of the (N−2)th frame and a captured LV image of the (N−1)th frame. Note that the process N is the same as the process N performed in FIG. 3, so the description thereof will be omitted.

In this process N, the learning model A 908 corresponding to learning model 208 is used.

A process (N+1) indicates the process when LV images are lost for two consecutive frames. Here, the concept of generating a substitute LV image of the missing (N+1)th frame from the estimated LV image 307 of the Nth frame estimated in the process N and a captured disturbance-reduced LV image 306 of the (N−1)th frame is shown. Note that the process (N+1) is also the same as the process (N+1) in FIG. 3, and the description thereof will be omitted. In this process (N+1), too, the learning model A 908 corresponding to the learning model 208 is used.

A process (N+2) indicates the process when the LV images are lost in three consecutive frames. Here, a concept of generating a substitute LV image of the missing (N+2)th frame from a disturbance-reduced LV image 1006 of the (N−1)th frame and an estimated LV image 309 of the (N+1)th frame estimated in the process (N+1) is shown.

First, the disturbance reducer 109 performs the disturbance reduction processing 302 on an LV image of the (N−1)th frame to generate the disturbance-reduced LV image 306 of the (N−1)th frame. Here, the disturbance-reduced LV image 306 of the (N−1)th frame generated in the process N may be used instead. Then, the disturbance-reduced LV image 306 of the (N−1)th frame and the estimated LV image 309 of the (N+1)th frame estimated by the process (N+1) are input.

In this process (N+2), the frames of the LV images used for estimation are not consecutive, so the estimated image generator 110 uses the learning model B 909 to estimate an LV image 1012 of the missing (N+2)th frame. Then, the disturbance adder 111 performs the disturbance addition processing 303 on the estimated LV image 1012 of the (N+2)th frame, and a substitute LV image 1013 of the missing (N+2)th frame is generated.

As described above, even if the images of the Nth, (N+1)th, and (N+2)th frames are continuously lost in time sequence, the substitute LV image 308 of the Nth frame, the substitute LV image 310 of the (N+1)th frame, and the substitute LV image 1013 of the (N+2)th frame can be generated by using the learning model A 908 and the learning model B 909. Then, following the LV images of the (N−2)th and (N−1)th frames, the substitute LV image 308 of the Nth frame, the substitute LV image 310 of the (N+1)th frame, and the substitute LV image 1013 of the (N+2)th frame are sequentially displayed on the display 103 via the display controller 102.

It should be noted that in the example shown in FIGS. 9A, 9B and 10, the learning model in which two frame images are input and the next frame is output is described as an example, but the present invention is not limited to this. For example, a learning model in which one frame image or three or more frame images are input may be used. Also, the frame image to be estimated is not limited to of the next continuous frame, but may be of a frame between frames, or of a frame at certain point in time that is not continuous. However, the timings of inputting/outputting of frame images in the learning model at the time of learning are the same for the learning model at the time of generating an estimated image.

Figure 11:
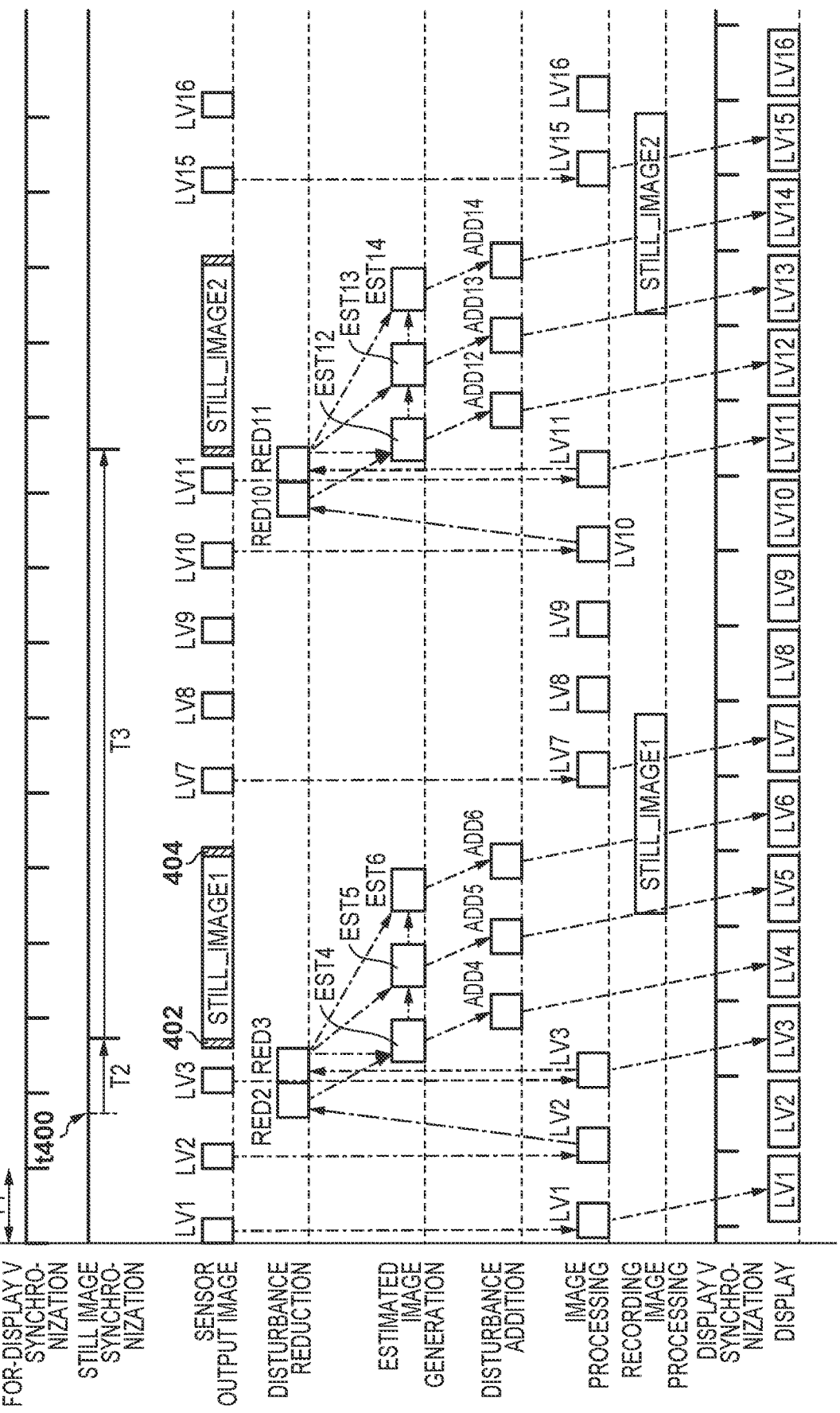
FIG. 11 is a timing chart for explaining LV images when continuous shooting of still images is performed during LV display according to the second embodiment.

FIG. 11 is a timing chart in a case where still images are continuously shot during LV display in the second embodiment. Timing signals and processes performed at the same timing are aligned in the vertical direction, and the horizontal direction shows time. Note, in FIG. 11, the description of the same parts as those in FIG. 4 will be omitted as appropriate.

The difference from the processes shown in FIG. 4 lies in the processes in EST6 and EST14. In EST6 of FIG. 11, an estimated LV image obtained in EST4 is not used, but a disturbance-reduced LV image obtained in RED3 and an estimated LV image obtained in EST5 are used. At this time, the learning model B 909 is used as described above. Similarly, in EST14, an estimated LV image obtained in EST12 is not used, but a disturbance-reduced LV image obtained in RED11 and an estimated LV image obtained in EST13 are used.

At this time, too, the learning model B 909 is used as described above.

Then, the estimated LV images estimated in EST4, EST5, EST6 and EST12, EST13, EST14 are subjected to disturbance addition in ADD4, ADD5, ADD6 and ADD12, ADD13, ADD14, respectively, and the obtained substitute LV images are recorded in the temporary memory 107 via the data transfer unit 105.

Then, image-processed image data LV1 to LV3, LV7 to LV11, LV15 and LV16 stored in the temporary memory 107 are read out to update the display. On the other hand, at the timing when the still image shooting is started and no LV image can be captured, the substitute LV images LV4, LV5, LV6 and LV12, LV13, LV14 to which disturbance is added in ADD4 to ADD6 and ADD12 to ADD14, are read out to update the display. In this manner, it is possible to perform continuous display of LV1 to LV16 even during still image shooting by using the substitute LV images corresponding to LV4 to LV6 and LV12 to LV14.

According to the second embodiment as described above, the learning model A 908 and the learning model B 909 are selectively used, and by always using the captured LV image as an input at the time of estimation, it is possible to generate and display a more accurate substitute frame image.

Third Embodiment

Next, a third embodiment of the present invention will be described. Note that the image capturing apparatus used in the third embodiment is the same as that described in the first embodiment, and description thereof will be omitted.

In the first embodiment, immediately preceding two frame images are input in generating an estimated LV image using a learning model. The third embodiment is different from the first embodiment in that not only the immediately preceding two frame images but also frame images obtained at arbitrarily different timings may be used as inputs.

Further, in the second embodiment, an example has been described in which learning models specific for different combinations of the timings of input frame images are created, and an estimated frame image is generated by selectively using one of the created learning models. The third embodiment is different from the second embodiment in that an estimated frame image is generated by using the same learning model by inputting timing information together with an input frame image.

Next, learning processing of a learning model used in the estimated image generator 110 in the third embodiment will be described with reference to FIGS. 12A and 12B. In FIGS. 12A and 12B, the same components as those in FIG. 2 and FIGS. 9A and 9B are denoted by the same reference numerals, and the description thereof will be omitted as appropriate.

The difference between a learning model 1208 shown in FIGS. 12A and 12B and the learning model 208 shown in FIG. 2, the learning model A908 and learning model B909 shown in FIGS. 9A and 9B is that time information of a frame image is input together with the frame image in the learning model 1208.

In the learning processing shown in FIG. 12A, together with disturbance-reduced frame images 205 and 206 of the (N−2)th frame and the (N−1)th frame, "−2" and "−1" are input as relative timing information 1209 and 1210, where the timing of a disturbance-reduced frame image 207 of the Nth frame which is to be used as training data at the time of learning is "0". Unit of the timing information is the number of frames with a given frame rate, and the past direction is indicated by minus notation, and the future direction is indicated by plus notation in the time axis direction. Therefore, the timing of one frame before is expressed as "4", and the timing of two frames before is expressed as "−2". In the learning model 1208, an estimated frame image of the Nth frame is generated by taking into consideration "−2" and "−1" which are the timing information 1209 and 1210. The learning model 1208 updates itself based on an error between the estimated frame image of the Nth frame and the disturbance-reduced frame image 207 of the Nth frame as the training data which is an expected value.

Next, in the learning processing shown in FIG. 12B, together with disturbance-reduced frame images 905 and 906 of the (N−3)th frame and the (N−1)th frame, "−3" and "−1" are input as relative timing information 1212 and 1213, where the timing of a disturbance-reduced frame image 907 of the Nth frame which is to be used as training data at the time of learning is "0". In the learning model 1208, an estimated frame image of the Nth frame is generated by taking into consideration "−3" and "−1" which are the timing information 1212 and 1213. The learning model 1208 updates itself based on an error between the estimated frame image of the Nth frame and the disturbance-reduced frame image 907 of the Nth frame as the training data which is an expected value.

In this way, the learning processing of the same learning model 1208 is performed with the disturbance-removed frame images at different time intervals as inputs.

Next, with reference to FIG. 13, a process of generating an estimated image by the estimated image generator 110 using the learning model 1208 according to this embodiment will be described. Note, in FIG. 13, the same parts as those in FIG. 10 are designated by the same reference numerals, and the description thereof will be omitted as appropriate.

If shooting of a still image starts while shooting LV images, shooting of LV images cannot be performed because the image sensor 100 is used to shoot the still image, and some frames will be lost. In this case, an LV image to be used as a substitute LV image of the missing frame is generated using the learned learning model 1208 obtained as described above.

Figure 13:
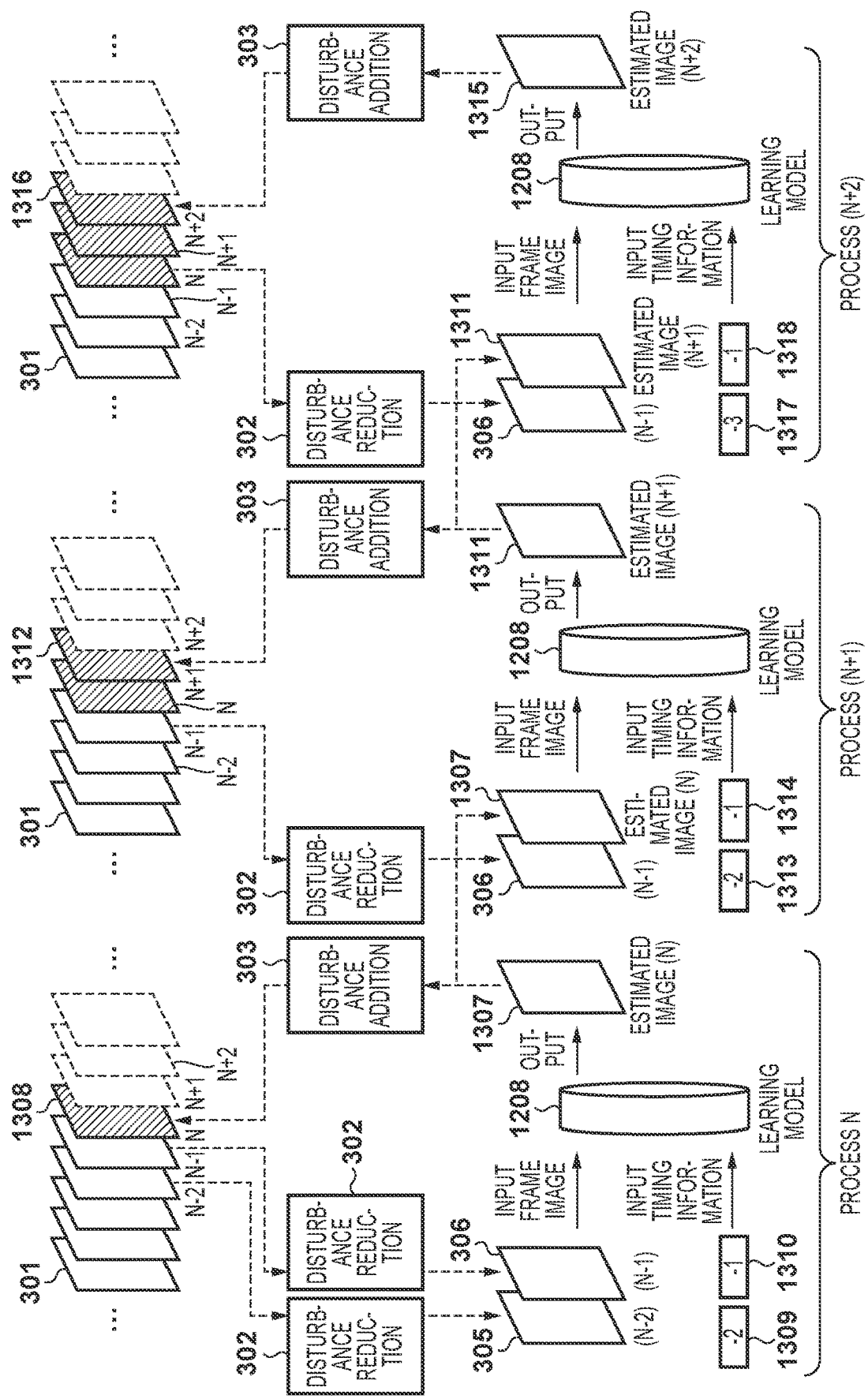
FIG. 13 is a diagram for explaining a substitute image generation processing using the learning model by the estimated image generator according to the third embodiment.

In FIG. 13, a process N shows the concept of generating an LV image of the missing Nth frame from a captured LV image of the (N−2)th frame and a captured LV image of the (N−1)th frame.

First, the disturbance reducer 109 performs the disturbance reduction processing 302 on the LV images of the (N−2)th frame and the (N−1)th frame to generate a disturbance-reduced LV image 305 of the (N−2)th frame and a disturbance-reduced LV image 306 of the (N−1)th frame. Then, together with the disturbance-reduced LV image 305 of the (N−2)th frame and the disturbance-reduced LV image 306 of the (N−1)th frame, "−2" as timing information 1309 and "−1" as timing information 1310 are input to the learning model 1208. The learning model 1208 estimates the estimated LV image 1307 of the Nth frame by taking into consideration "−2" as the timing information 1309 and "−1" as the timing information 1310. Then, the estimated LV image 1307 of the Nth frame is subjected to the disturbance addition processing 303 by the disturbance adder 111 to generate a substitute LV image 1308 of the missing Nth frame.

A process (N+1) shows the process in a case where LV images are lost in two consecutive frames. Here, a concept of generating a substitute LV image of the missing (N+1)th frame from the estimated LV image 1307 of the Nth frame estimated in the process N and the captured disturbance-reduced LV image 306 of the (N−1)th frame is shown.

First, the disturbance reduction processing 302 is performed on an LV image of the (N−1)th frame by the disturbance reducer 109 to generate the disturbance-reduced LV image 306 of the (N−1)th frame. Here, the disturbance-reduced LV image 306 of the (N−1)th frame generated in the process N may be used instead. Then, the disturbance-reduced LV image 306 of the (N−1)th frame, the estimated LV image 1307 of the Nth frame estimated in the process N, "−2" as timing information 1313, and "−1" as timing information 1314 are input to the learning model 1208. The learning model 1208 estimates an estimated LV image 1311 of the (N+1)th frame by taking into consideration "−2" as the timing information 1309 and "−1" as the timing information 1310. Then, the estimated LV image 1311 of the (N+1)th frame is subjected to the disturbance addition processing 303 by the disturbance adder 111, and a substitute LV image 1312 of the missing (N+1)th frame is generated.

A process (N+2) indicates the process when LV images are lost in three consecutive frames. Here, a concept of generating a substitute LV image of the missing (N+2)th frame from the disturbance-reduced LV image 306 of the (N−1)th frame and the estimated LV image 1311 of the (N+1)th frame estimated in the process (N+1) is shown.

First, the disturbance reducer 109 performs the disturbance reduction processing 302 on an LV image of the (N−1)th frame to generate the disturbance-reduced LV image 306 of the (N−1)th frame. Here, the disturbance-reduced LV image 306 of the (N−1)th frame generated in the process N may be used instead. Then, the disturbance-reduced LV image 306 of the (N−1)th frame, the estimated LV image 1311 of the (N+1)th frame estimated in the process (N+1), "−3" as timing information 1317 and "−1" as timing information 1318 are input to the learning model 208. The learning model 1208 estimates an estimated LV image 1315 of the (N+2)th frame by tanking into consideration "−3" of the timing information 1317 and "−1" of the timing information 1318. Then, the disturbance adder 111 performs the disturbance addition processing 303 on the estimated LV image 1315 of the (N+2)th frame, thereby a substitute LV image 1316 of the missing (N+2)th frame is generated.

As described above, even if the images of the Nth, (N+1)th, and (N+2)th frames are continuously lost in time sequence, the substitute LV image 1308 of the Nth frame, the substitute LV image 1312 of the (N+1)th frame, and the substitute LV image 1316 of the (N+2)th frame can be generated by using the learning model 1208. Then, following the LV images of the (N−2)th and (N−1)th frames, the substitute LV image 1308 of the Nth frame, the substitute LV image 1312 of the (N+1)th frame, and the substitute LV image 1316 of the (N+2)th frame are sequentially displayed on the display 103 via the display controller 102.

According to the third embodiment as described above, by using timing information in the learning model 1208, it is possible to generate and display a more accurate substitute frame image.

It should be noted that in the example shown in FIGS. 12A, 12B and 13, the learning model in which two frame images are input and the next frame is output is described as an example, but the present invention is not limited to this. For example, a learning model in which one frame image or three or more frame images are input may be used. Also, the frame image to be estimated is not limited to of the next continuous frame, but may be of a frame between frames, or of frames at certain points in time that are not continuous. However, the timings of inputting/outputting frame images in the learning model at the time of learning are the same for the learning model at the time of generating an estimated image.

Note that the timing chart in the case of continuously shooting still images during LV display in the third embodiment is the same as the timing chart of FIG. 11 in the second embodiment, therefore, description thereof will be omitted here. In addition, it is obvious from the above description that the learning model 1208 is used instead of the learning model A908 and the learning model B909 in the timings EST4, EST5, EST6, EST12, EST13, and EST14.

<Modification>

Figure 14:
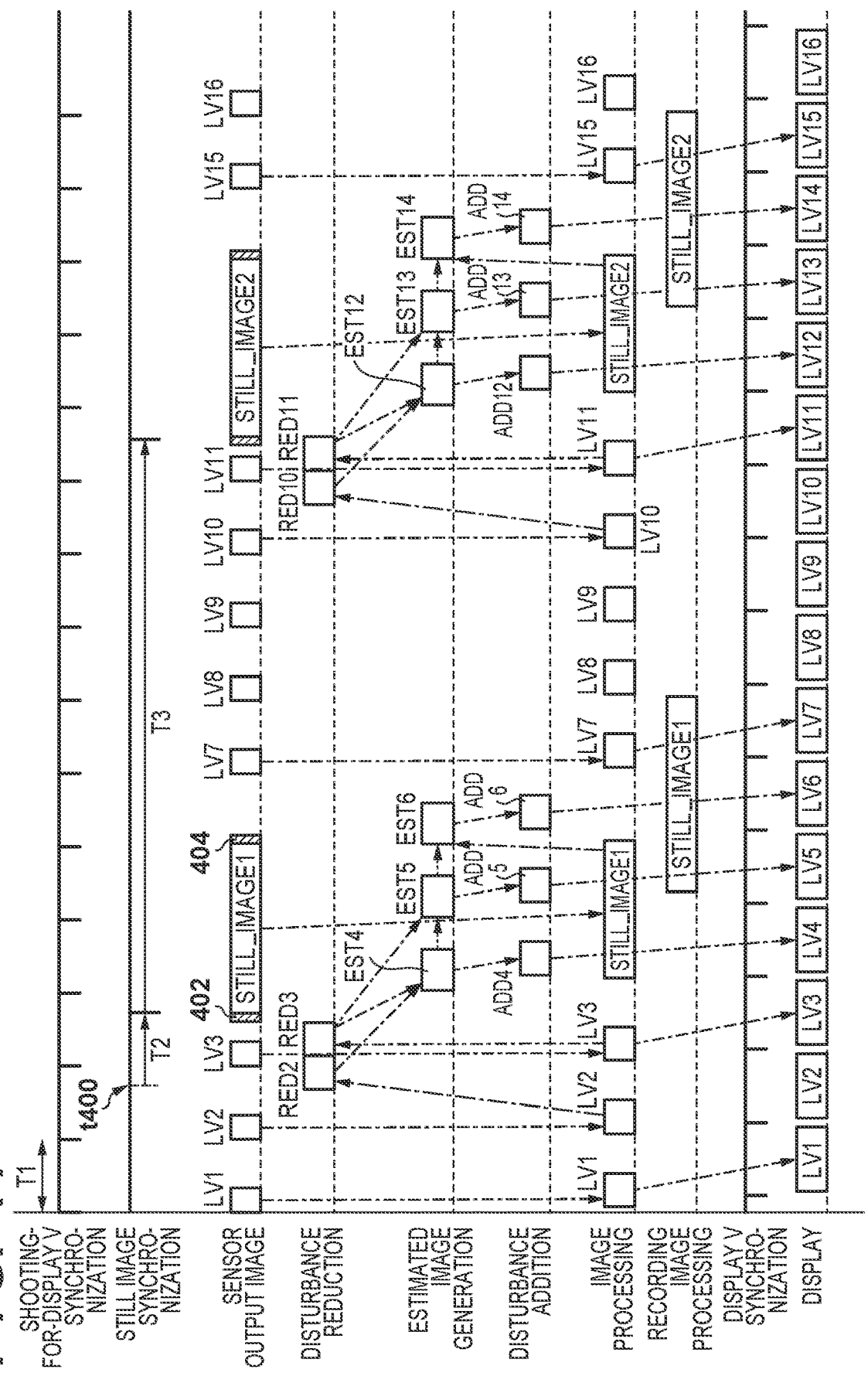
FIG. 14 is a timing chart for explaining LV images when continuous shooting of still images is performed during LV display according to a modification of the third embodiment.

FIG. 14 is a timing chart showing another example of generation processing of a substitute LV image using the learning model 1208 of the third embodiment. Timing signals and processes performed at the same timing are aligned in the vertical direction, and the horizontal direction shows time. Note, in FIG. 14, the description of the same parts as those in FIG. 11 will be omitted as appropriate.

One of the differences between the processing shown FIG. 14 and FIG. 11 is that in the example shown in FIG. 14, in the "image processing", the image processing for display performed on an LV image is performed on both LV images and still images. In FIG. 14, the image processing for display performed on the LV image is represented as LV1 to LV3, LV7 to LV11, LV15, and LV16, and the image processing for display performed on the still image is represented as STILL_IMAGE1 and STILL_IMAGE2.

Further, another difference between the processing shown FIG. 14 and FIG. 11 lies in the processing performed in EST6 and EST14. In EST6 of FIG. 14, the disturbance-reduced LV image obtained in RED3 is not used, but an estimated LV image generated in EST5 and a still image which has undergone image processing in STILL_IMAGE1 are used. At this time, the timing information "−1" and "−1.5" of EST5 and STILL_IMAGE1 are input to the learning model 1208, and the learning model 1208 takes this information into consideration to generate an estimated LV image. Then, the estimated LV image generated in EST6 is written to the temporary memory 107 via the data transfer unit 105.

Here, the timing information "−1.5" of STILL_IMAGE1 indicates a relative timing with respect to an estimated LV image to be generated and, given that an exposure timing for shooting an LV image LV6 in a case where still image shooting is not performed is set to "0", corresponds to a timing of the barycenter of an exposure period of STILL_IMAGE1 shown in "sensor output image".

EST14 indicates a process of generating an estimated LV image for LV14, and the same process as the process in EST6 is performed.

As described above, according to the modification, in addition to the same effect as that of the third embodiment, by using a still image obtained by still image shooting, smooth display with good visibility can be realized.

Other Embodiments

In the above-described embodiment, a case where the continuous shooting of still images is performed has been described, but the present invention may be applied to a case where single shooting of still image is performed.

Further, the present invention may be applied to a system including a plurality of devices or an apparatus including a single device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180713, filed on Sep. 30, 2019 which is hereby incorporated by reference herein in its entirety.

What is claimed is:

1. An image processing apparatus comprising:
   a reduction unit that reduces predetermined disturbance in a frame image shot by an image sensor;
   an estimation unit that estimates from at least one first frame image from which the disturbance is reduced, a second frame image of a point of time after the first frame image using a learning model; and
   an addition unit that adds the disturbance to the second frame image,
   wherein each unit is implemented by one or more processors, circuitry or a combination thereof.

2. The image processing apparatus according to claim 1, wherein the frame images periodically shot by the image sensor and the second frame image to which the predetermined disturbance is added by the addition unit are output to a display unit in time series.

3. The image processing apparatus according to claim 1, wherein the predetermined disturbance includes disturbance that fluctuates according to a shooting condition of an imaging optical member, shake of the image processing apparatus, movement of a subject to be shot, and fluctuation of brightness.

4. The image processing apparatus according to claim 1, wherein the learning model is generated for each period using a plurality of frame images shot at a plurality of different periods, and
wherein the second frame image is estimated using a learning model corresponding to the period of the first frame images.

5. The image processing apparatus according to claim 1, wherein upon estimating the second frame image, the estimation unit further uses time information indicating timing of shooting the first frame image.

6. The image processing apparatus according to claim 5, wherein, in a case where the periodical shooting of frame images by the image sensor is interrupted in order to shoot a still image, the first frame image used for estimating the second frame image corresponding to a frame image which is lost during the interruption includes the still image.

7. The image processing apparatus according to claim 1, wherein, in a case where the frame images are periodically shot by the image sensor and periodical shooting of the frame images is interrupted, the estimation unit estimates the second frame image corresponding to a frame image which is lost during the interruption.

8. The image processing apparatus according to claim 7, wherein the first frame image used for estimating the second frame image corresponding to the lost frame image includes a frame image estimated at a point of time before estimating the second frame image.

9. The image processing apparatus according to claim 7, wherein the first frame image used for estimating the second frame image corresponding to the lost frame image includes at least one frame image shot by the image sensor and from which the disturbance is reduced.

10. The image processing apparatus according to claim 1, wherein the learning model is updated based on an error between two frame images, one being the second frame image estimated by using at least one frame image from which the disturbance is reduced among a plurality of frame images periodically shot by the image sensor as the first frame image, the other being a frame image from which the disturbance is reduced of the same frame as the second frame image among the plurality of frame images.

11. The image processing apparatus according to claim 10, wherein the first frame images used for updating the learning model are a plurality of continuous frame images among the plurality of frame images.

12. The image processing apparatus according to claim 10, wherein the first frame images used for updating the learning model are a plurality of non-continuous frame images among the plurality of frame images.

13. The image processing apparatus according to claim 10, wherein the learning model includes a first learning model updated by using continuous frame images among the plurality of frame images periodically shot by the image sensor and a second learning model updated by using non-continuous frame images among the plurality of frame images periodically shot by the image sensor, and
wherein, in a case where periodical shooting of frame images by the image sensor is interrupted, the estimation unit estimates the second frame image corresponding to a frame image which is lost during the interruption using the first learning model in a case where the plurality of continuous frame images are used as the first frame images, and using the second learning model in a case where the plurality of non-continuous frame image are used as the first frame images.

14. An image capturing apparatus comprising:
an image sensor; and
an image processing apparatus comprising:
a reduction unit that reduces predetermined disturbance in a frame image shot by an image sensor;
an estimation unit that estimates from at least one first frame image from which the disturbance is reduced, a second frame image of a point of time after the first frame image using a learning model; and
an addition unit that adds the disturbance to the second frame image,
wherein each unit is implemented by one or more processors, circuitry or a combination thereof.

15. An image processing method comprising:
reducing predetermined disturbance in a frame image shot by an image sensor;
estimating from at least one first frame image from which the disturbance is reduced, a second frame image of a point of time after the first frame image using a learning model; and
adding the disturbance to the second frame image.

16. A non-transitory storage medium storing a program that causes a computer to function as each unit of an image processing apparatus comprising: a reduction unit that reduces predetermined disturbance in a frame image shot by an image sensor; an estimation unit that estimates from at least one first frame image from which the disturbance is reduced, a second frame image of a point of time after the first frame image using a learning model; and an addition unit that adds the disturbance to the second frame image.

* * * * *